(12) United States Patent
Kim

(10) Patent No.: US 12,542,112 B2
(45) Date of Patent: Feb. 3, 2026

(54) DISPLAY SYSTEM, DISPLAY DRIVING METHOD AND AUTOMOTIVE VEHICLE

(71) Applicant: LG Display Co., Ltd., Seoul (KR)

(72) Inventor: Jung-Gyum Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/914,624

(22) Filed: Oct. 14, 2024

(65) Prior Publication Data
US 2025/0140215 A1    May 1, 2025

(30) Foreign Application Priority Data
Oct. 26, 2023  (KR) .................. 10-2023-0144325

(51) Int. Cl.
| | | |
|---|---|---|
| G09G 3/00 | (2006.01) | |
| B60K 35/22 | (2024.01) | |
| G02F 1/1335 | (2006.01) | |
| G02F 1/13357 | (2006.01) | |
| G09G 3/34 | (2006.01) | |
| G09G 3/36 | (2006.01) | |
| H10D 86/40 | (2025.01) | |
| H10D 86/60 | (2025.01) | |

(52) U.S. Cl.
CPC .......... *G09G 3/3648* (2013.01); *B60K 35/22* (2024.01); *G02F 1/133512* (2013.01); *G02F 1/133526* (2013.01); *G02F 1/133603* (2013.01); *G09G 3/3426* (2013.01); *H10D 86/441* (2025.01); *H10D 86/60* (2025.01); *B60K 2360/349* (2024.01); *G09G 2300/0452* (2013.01); *G09G 2300/0842* (2013.01); *G09G 2310/08* (2013.01); *G09G 2320/043* (2013.01)

(58) Field of Classification Search
CPC ........ B60K 2360/332; B60K 2360/349; B60K 35/22; B60K 35/60; G02F 1/133512; G02F 1/133526; G02F 1/133603; G09G 2300/0452; G09G 2300/0842; G09G 2310/08; G09G 2320/043; G09G 3/3426; G09G 3/3648; H10D 86/441; H10D 86/60

See application file for complete search history.

(56) References Cited

U.S. PATENT DOCUMENTS

2022/0077431 A1* 3/2022 Lee .................... H10K 59/8792
2022/0399529 A1* 12/2022 Shin .................... G09G 3/3275

* cited by examiner

*Primary Examiner* — Insa Sadio
(74) *Attorney, Agent, or Firm* — Seed Intellectual Property Law Group LLP

(57) ABSTRACT

The present disclosure relates to a display system, display driving method and a vehicle. Embodiments of the disclosure may provide a display system comprising a display panel including a plurality of unit subpixels comprising a first subpixel with a first emission angle and a second subpixel with a second emission angle, a gate driving circuit configured to supply gate signals to the display panel, and a timing controller configured to control an emission cycle of the first subpixel or the second subpixel for an emission cycle control area between an first area where the first subpixel emits light and an second area where the second subpixel emits light.

25 Claims, 21 Drawing Sheets

DISPLAY SYSTEM, DISPLAY DRIVING METHOD AND AUTOMOTIVE VEHICLE

CROSS-REFERENCE TO RELATED APPLICATION

This application claims priority from Korean Patent Application No. 10-2023-0144325, filed on Oct. 26, 2023, which is hereby incorporated by reference for all purposes as if fully set forth herein.

BACKGROUND

Technical Field

Embodiments of the disclosure relate to a display system, a display driving method and a vehicle capable of improving a degradation characteristic of the display system in the vehicle.

Description of the Related Art

A Vehicle means a transportation device that can move people or loads using kinetic energy. Here, the vehicle can include various types of transportation device that can transport people, such as a car, a truck, a bus, an airplane, and a ship.

For the safety and convenience of vehicle users, the vehicle may include various sensors and electronic devices, and functions of the vehicle are becoming more diverse.

Functions of the vehicle may include convenience functions to promote convenience of drivers and safety functions to promote safety of drivers or pedestrians.

Convenience functions may include technologies such as functions for providing infotainment (information+entertainment), an autonomous driving function, and a function for helping the driver secure visibility at night or in blind areas. For example, functions of active cruise control (ACC), smart parking assist system (SPAS), night vision (NV), head up display (HUD), and around view monitor (AVM), and adaptive headlight system (AHS) may be referred as convenience functions.

Safety functions may include technologies that ensure the safety of drivers or pedestrians, such as lane departure warning system (LDWS), lane keeping assist system (LKAS), and autonomous emergency braking (AEB) system, etc.

Meanwhile, a vehicle may include a display system with various types of display panels. A vehicle control device may provide various convenience functions and safety functions to the driver or passengers by controlling the information supplied to the internal display panel.

Various types of display panels may be liquid crystal displays, organic light-emitting display panels, etc.

At this time, because there may be other passengers as well as the driver inside the vehicle, different information may be displayed through a plurality of display panels so that the occupants (driver or passenger) can recognize it.

BRIEF SUMMARY

For this purpose, a plurality of emission areas with different emission angles may be arranged on the display panel. At this time, there is a problem of luminance deviation occurring due to different degradation in the emission areas with different emission angles.

The inventors of the disclosure have invented a display system, a display driving method and a vehicle capable of improving a degradation characteristic of the display system in the vehicle.

Embodiments of the disclosure may provide a display system, a display driving method and a vehicle capable of improving a degradation characteristic by controlling driving cycles of a plurality of emission areas with different emission angles.

Embodiments of the disclosure may provide a display system, a display driving method and a vehicle capable of improving a degradation characteristic by varying driving cycles depending on locations based on a boundary of a plurality of emission areas with different emission angles.

Embodiments of the disclosure provide a display system comprising a display panel including a plurality of unit subpixels comprising a first subpixel with a first emission angle and a second subpixel with a second emission angle, a gate driving circuit configured to supply gate signals to the display panel, and a timing controller configured to control an emission cycle of the first subpixel or the second subpixel for an emission cycle control area between an first area where the first subpixel emits light and an second area where the second subpixel emits light.

Embodiments of the disclosure provide a display driving method of driving a display panel including a plurality of unit subpixels comprising a first subpixel with a first emission angle and a second subpixel with a second emission angle, comprising a step of driving the first subpixel for a first area of the display panel, a step of driving the second subpixel for a second area of the display panel, a step of emitting alternately the first subpixel and the second subpixel at a predetermined cycle for a 1-1 area within the first area, and a step of emitting alternately the first subpixel and the second subpixel at a predetermined cycle for a 2-1 area within the second area.

Embodiments of the disclosure provide a vehicle comprising a display panel including a plurality of unit subpixels comprising a first subpixel with a first emission angle and a second subpixel with a second emission angle, a gate driving circuit configured to supply gate signals to the display panel, and a timing controller configured to control an emission cycle of the first subpixel or the second subpixel for an emission cycle control area between an first area where the first subpixel emits light and an second area where the second subpixel emits light.

According to embodiments of the disclosure, it is possible to provide a low-power display system capable of reducing power consumption for compensation of characteristic value by improving the degradation characteristics of the display system in the vehicle.

According to embodiments of the disclosure, it is possible to improve a degradation characteristic by controlling driving cycles of a plurality of emission areas with different emission angles.

According to embodiments of the disclosure, it is possible to improve a degradation characteristic by varying driving cycles depending on locations based on a boundary of a plurality of emission areas with different emission angles.

DESCRIPTION OF THE SEVERAL VIEWS OF THE DRAWINGS

The above and other objects, features, and advantages of the disclosure will be more clearly understood from the following detailed description, taken in conjunction with the accompanying drawings, in which.

DETAILED DESCRIPTION

Figure 1:
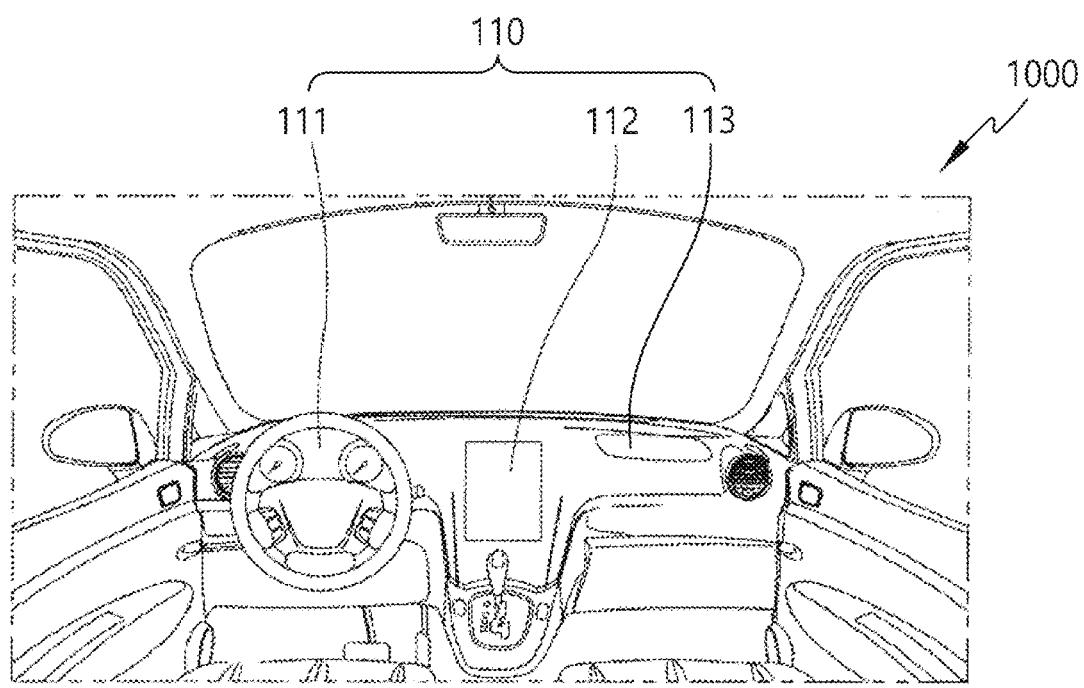
FIG. 1 is a diagram illustrating an interior of a vehicle according to embodiments of the present disclosure.

Hereinafter, some embodiments of the disclosure will be described in detail with reference to exemplary drawings. In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including," "having," "containing," "constituting" "make up of," and "formed of" used herein are generally intended to allow other components to be added unless the terms are used with the term "only." As used herein, singular forms are intended to include plural forms unless the context clearly indicates otherwise.

Terms, such as "first," "second," "A," "B," "(A)," or "(B)" may be used herein to describe elements of the disclosure. Each of these terms is not used to define essence, order, sequence, or number of elements, etc., but is used merely to distinguish the corresponding element from other elements.

When it is mentioned that a first element "is connected or coupled to," "contacts or overlaps," etc., a second element, it should be interpreted that, not only can the first element "be directly connected or coupled to" or "directly contact or overlap" the second element, but a third element can also be "interposed" between the first and second elements, or the first and second elements can "be connected or coupled to," "contact or overlap," etc., each other via a fourth element. Here, the second element may be included in at least one of two or more elements that "are connected or coupled to," "contact or overlap," etc., each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes, etc., are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various embodiments of the disclosure will be described in detail with reference to the accompanying drawings.

FIG. 1 is a diagram illustrating an interior of a vehicle according to embodiments of the present disclosure.

Referring to FIG. 1, the interior of the vehicle 1000 according to embodiments of the present disclosure may include a driver's seat, a passenger's seat, a dashboard, which has various instruments for driving, located in front of the driver's seat and passenger's seat, and a center fascia with a control plate for electronic devices The dashboard may include a first display panel 111 for displaying information for driving, including a speedometer. The first display panel 111 may be referred to as an dashboard display panel.

The first display panel 111 is a display panel for allowing the vehicle 1000 to be driven safely by transmitting information for the driving status of the vehicle 1000 and the operation of various electronic devices installed in the vehicle 1000 to the driver. The first display panel 111 located behind the steering wheel relative to the driver's seat may include a speedometer for indicating a driving speed, a tripmeter for indicating a driving distance, a tachometer for indicating engine rotation speed, a fuel gauge, a water temperature gauge, an engine temperature gauge, and various warning lamps.

The center fascia may be located between the driver's seat and the passenger's seat, and may correspond to the area where the dashboard and shift lever meet vertically. An audio, an air conditioner, a heater controller, a navigator, an air vent, a cigar jack, an ashtray, a cup holder, etc., may be disposed on the center fascia. Additionally, the center fascia may include a second display panel 112.

The second display panel 112 may display a route to the destination or display a map image corresponding to the current location, and may display a user interface related to the control of various electronic devices in the vehicle 1000. Additionally, when the vehicle 1000 is connected to a mobile device, a screen provided by the mobile device may be displayed in the second display panel 112.

The second display panel 112 located between the driver's seat and the passenger's seat of the vehicle 1000 may be referred to as a center fascia display panel.

Additionally, a third display panel 113 may be located on the front of the passenger's seat for the convenience of passengers. The third display panel 113 located on the passenger's seat can be referred to as the passenger display panel.

Moreover, the display panel 110 may include at least one of a front window display panel, a side mirror display panel, a rear mirror display panel and a side window display panel in addition to the first display panel 111 (the dashboard display panel), a second display panel 112 (the center fascia display panel), and the passenger display panel 113. Of course, various types of display panels may be more installed.

The front window display panel may be a display panel that projects a virtual image on a partial area of the front window that can see through the front of the vehicle 1000. By displaying a vehicle speed, a remaining fuel, and route information through the front window display panel, it may reduce the driver's unnecessary shifting of gaze elsewhere.

The side mirror display panel may be a display panel that can display a side image captured through a side camera on a partial or entire area of a side mirror to view the side of the vehicle 1000. Therefore, the driver may check not only the side image reflected through the side mirror, but also the side image captured through the side camera through the side mirror display panel.

The rear mirror display panel may be a display panel that can display a rear image captured through a rear camera on a partial or entire area of a rear mirror to view the rear of the vehicle 1000. Therefore, the driver may check not only the rear image reflected through the rear mirror, but also the rear image captured through the rear camera through the rear mirror display panel.

The side window display panel may be a display panel for projecting a virtual image on a partial area of the side window that can see through the side of the vehicle 1000. Various information for the vehicle may be displayed through the side window display panel.

Figure 2:
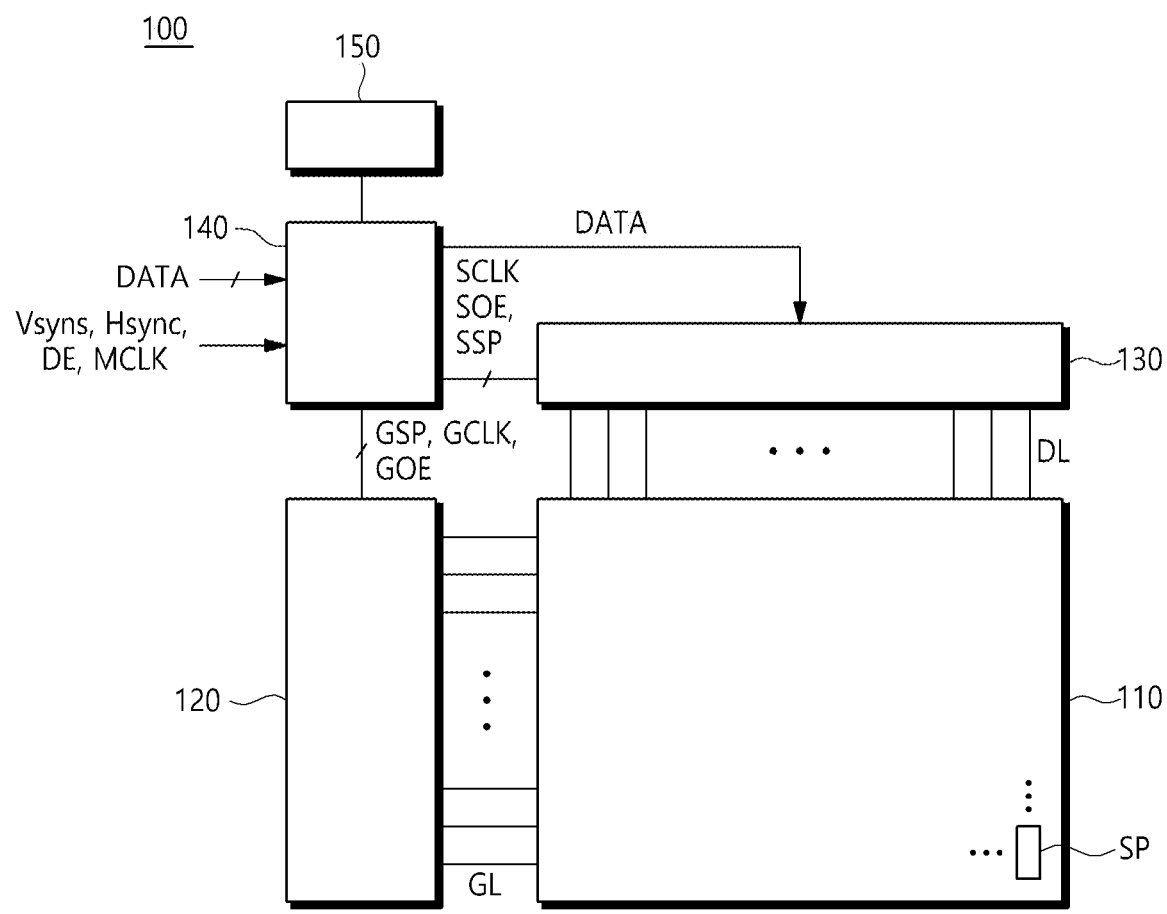
FIG. 2 is a schematic diagram illustrating a configuration of a display system according to embodiments of the present disclosure.

FIG. 2 is a schematic diagram illustrating a configuration of a display system according to embodiments of the present disclosure.

Referring to FIG. 2, a display system 100 according to embodiments of the present disclosure may include a display panel 110 which is connected to a plurality of gate lines GL and a plurality of data lines DL and in which a plurality of subpixels SP are disposed in the form of a matrix, a gate driving circuit 120 which provides gate signals to the plurality of gate lines GL, a data driving circuit 130 which supplies a data voltage through the plurality of data lines DL, a timing controller 140 for controlling the gate driving circuit 120 and the data driving circuit 130, and a power management circuit 150 which provides power for display driving operation.

The display panel 110 displays an image based on scan signals transmitted from the gate driving circuit 120 through the plurality of gate lines GL and data voltages transmitted from the data driving circuit 130 through the plurality of data lines DL.

In the case of a liquid crystal display system, the display panel 110 includes a liquid crystal layer formed between two substrates and may operate in any known mode such as a twisted nematic (TN) mode, a vertical alignment (VA) mode, an in plane switching (IPS) mode, or a fringe field switching (FFS) mode. Meanwhile, in the case of an organic light-emitting display system, the display panel 110 may be implemented in a top emission method, a bottom emission method, or a dual emission method.

In the display panel 110, a plurality of subpixels SP may be disposed in the form of a matrix, each subpixel SP may be formed of subpixels SP having different colors, for example, a white subpixel, a red subpixel, a green subpixel, and a blue subpixel, and each sub-pixel SP may be defined by the plurality of data lines DL and the plurality of gate lines GL.

One subpixel SP may include a thin film transistor (TFT), a light emission element which emits light according to the data voltage, and a storage capacitor electrically connected to the light emission element to maintain a voltage, which are disposed in an area formed by one data line DL and one gate line GL.

For example, when the display system 100 having a 2,160×3,840 resolution is formed of four subpixels SP, including a white subpixel, a red subpixel, a green subpixel, and a blue subpixel, because there are 2,160 gate lines GL and 3,840 data lines DL connected to the four subpixels SP, a total of 3,840×4=15,360 data lines DL may be provided, and the subpixels SP may be disposed in areas formed by the gate lines GL and the data lines DL.

The gate driving circuit 120 is controlled by the timing controller 140 and sequentially outputs scan signals to the plurality of gate lines GL disposed in the display panel 110 to control driving timings of the plurality of subpixels SP.

Depending on the case, the gate driving circuit 120 may generate scan signals that control the driving timing of the subpixel SP and light emission signals that control the light emission timing of the subpixel SP. In this case, the gate signal generated from the gate driving circuit 120 may include scan signals and light emission signals. A circuit that generates the scan signals and a circuit that generates the light emission signals may be implemented as separate circuits or as one circuit.

If the circuit that generates the scan signals and the circuit that generates the light emission signals are implemented as separate circuits, the gate driving circuit 120 may include a scan driving circuit that generates the scan signals and a light emission driving circuit that generates the light emission signals.

In the display system 100 having a 2,160×3,840 resolution, a case in which scan signals are sequentially output from the first gate line to the 2,160th gate line with respect to the 2,160 gate lines GL may be referred to as 2,160-phase driving. Alternatively, as in a case of sequentially outputting scan signals from the first gate line to the fourth gate line and then sequentially outputting the scan signals from the fifth gate line to the eighth gate line, a case in which scan signals are sequentially output on basis of four gate lines GL may be referred to as four-phase driving. That is, a case in which scan signals are sequentially output for every N gate lines GL may be referred to as N-phase driving.

In this case, the gate driving circuit 120 may include one or more gate driving integrated circuits GDIC, and according to a driving method, the gate driving circuit 120 may be positioned on only one side or both sides of the display panel 110. Alternatively, the gate driving circuit 120 may be directly formed in a bezel area of the display panel 110 to be implemented in the form of a gate in panel (GIP).

The data driving circuit 130 receives digital image data DATA from the timing controller 140 and converts the received digital image data DATA into an analog data voltage. Then, the data voltage is output to each data line DL according to a timing when the scan signal is applied through the gate line GL, and thus each subpixel SP connected to the data line DL displays a light emission signal with a brightness corresponding to the data voltage.

Similarly, the data driving circuit 130 may include one or more source driving integrated circuits SDIC, and the source driving integrated circuits SDIC may be connected to a bonding pad of the panel 110 or may be directly disposed on the display panel 110 using a tape automated bonding (TAB) method or a chip on glass (COG) method.

In some cases, each source driving integrated circuit SDIC may be integrated and disposed in the display panel 110. In addition, each source driving integrated circuit SDIC may be implemented in a chip on film (COF) method. In this case, each source driving integrated circuit SDIC may be mounted on a circuit film and may be electrically connected to the data lines DL of the display panel 110 through the circuit film.

The timing controller 140 supplies various control signals to the gate driving circuit 120 and the data driving circuit 130 to control operations of the gate driving circuit 120 and the data driving circuit 130. That is, the timing controller 140 controls the gate driving circuit 120 to generate the scan signals according to a timing implemented in each frame, and on the other hand, the timing controller 140 controls the data driving circuit 130 to convert image data DATA and generate data voltage.

In this case, in addition to the digital image data DATA, the timing controller 140 may receive various timing signals including a vertical synchronization signal Vsync, a horizontal synchronization signal Hsync, a data enable signal DE, and a main clock MCLK from an external component (e.g., a host system).

The host system may include one or more of a TV (Television) system, a set-top box, a navigation system, a personal computer (PC), a home theater system, a mobile device, and a wearable device.

Accordingly, the timing controller 140 generates control signals using the various timing signals received from the host system and transmits the control signals to the gate driving circuit 120 and the data driving circuit 130.

For example, in order to control the gate driving circuit 120, the timing controller 140 outputs various gate control signals including a gate start pulse GSP, a gate clock GCLK, and a gate output enable signal GOE. Here, the gate start pulse GSP controls timings at which one or more GDICs constituting the gate driving circuit 120 start to operate. In addition, the gate clock GCLK is a clock signal commonly input to the one or more gate driving integrated circuits GDIC and controls a shift timing of the scan signal. In addition, the gate output enable signal GOE specifies timing information of the one or more gate driving integrated circuits GDIC.

In addition, in order to control the data driving circuit 130, the timing controller 140 outputs various data control signals including a source start pulse SSP, a source sampling clock SCLK, and a source output enable signal SOE. Here, the source start pulse SSP controls timings at which the one or more SDICs constituting the data driving circuit 130 start to sample data. The source sampling clock SCLK is a clock signal for controlling a timing at which the SDIC samples data. The source output enable signal SOE controls an output timing of the data driving circuit 130.

The display system 100 may further include a power management circuit 150 for supplying various voltages or currents to the display panel 110, the gate driving circuit 120, or the data driving circuit 130 or controlling various voltages or various currents which are to be supplied.

The power management circuit 150 may generate power required to drive the display panel 110, the gate driving circuit 120, and the data driving circuit 130 by adjusting direct input voltages.

Figure 3:
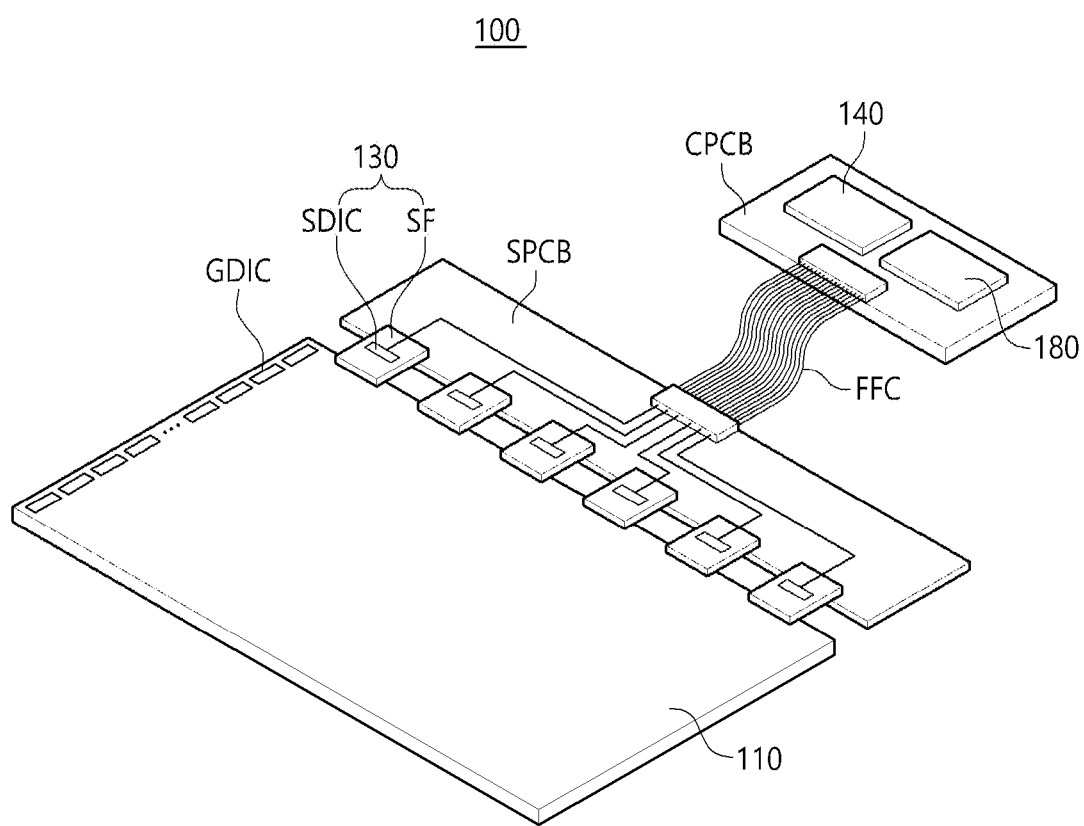
FIG. 3 is an exemplary diagram illustrating a display system according to embodiments of the present disclosure.

FIG. 3 is an exemplary diagram illustrating a display system according to embodiments of the present disclosure.

Referring to FIG. 3, in the display system 100 according to embodiments of the present disclosure, the source driving integrated circuit SDICs included in the data driving circuit 130 may be implemented in the form of a COF method among various methods (TAB, COG, and COF) and the gate driving circuit 120 may be implemented in the form of a GIP among various methods (TAB, COG, COF, and GIP).

When the gate driving circuit 120 is implemented in the form of a GIP, the plurality of gate driving integrated circuits GDIC included in the gate driving circuit 120 may be directly formed in a non-display area of the display panel 110. In this case, the gate driving integrated circuit GDIC may receive various signals (a clock signal, a gate high signal, and a gate low signal) required for generating a scan signal through gate driving related signal lines disposed in the non-display area.

Similarly, the one or more source driving integrated circuits SDIC included in the data driving circuit 130 may each be mounted on a source film SF, and one side of the source film SF may be electrically connected to the display panel 110. In addition, lines for electrically connecting the source driving integrated circuit SDIC to the display panel 110 may be disposed on the source film SF.

The display system 100 may include at least one source printed circuit board SPCB for circuitally connecting the plurality of source driving integrated circuits SDIC to other devices, and a control printed circuit board CPCB for mounting control components and various electric devices.

In this case, one side of the source film SF on which the source driving integrated circuit SDIC is mounted may be connected to the at least one source printed circuit board SPCB. That is, the one side of the source film SF on which the source driving integrated circuit SDIC is mounted may be electrically connected to the display panel 110, and the other side thereof may be electrically connected to the source printed circuit board SPCB.

The timing controller 140 and the power management circuit 150 may be mounted on the control printed circuit board CPCB. The timing controller 140 may control operations of the data driving circuit 130 and the gate driving circuit 120. The power management circuit 150 may supply a driving voltage or current to the display panel 110, the data driving circuit 130, and the gate driving circuit 120 and control a voltage or current to be supplied.

At least one source printed circuit board SPCB and at least one control printed circuit board CPCB may be electrically connected through at least one connection member, and the connection member may be formed as, for example, a flexible printed circuit FPC, a flexible flat cable FFC, or the like. In addition, the at least one source printed circuit board SPCB and the at least one control printed circuit board CPCB may be implemented to be integrated into one printed circuit board.

In the case of the display system 100 having the above configuration, the power management circuit 150 transmits a driving voltage required for driving a display or detecting a characteristic value to the source printed circuit board SPCB through the flexible printed circuit FPC or the flexible flat cable FFC. The driving voltage transmitted to the source printed circuit board SPCB is supplied through the source driving integrated circuit SDIC to drive a specific subpixel SP in the display panel 110 to emit light or to sense the specific subpixel SP.

In this case, each subpixel SP disposed in the display panel 110 may include the light emission element and a circuit element such as a driving transistor for driving the light emission element.

Figure 4:
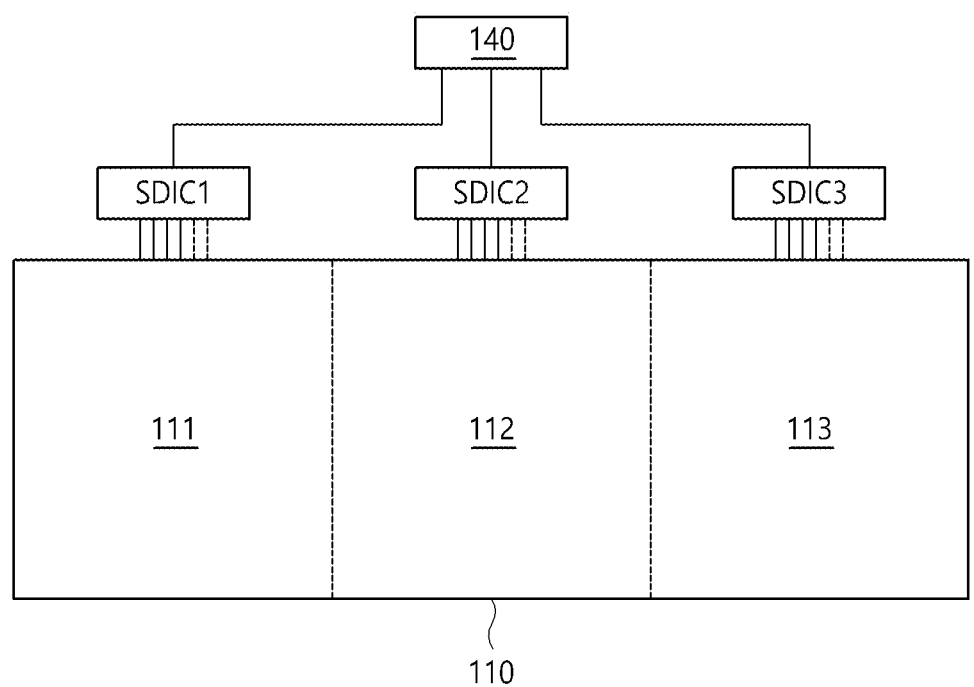
FIG. 4 is a diagram showing an example of a structure for driving a plurality of display panels in a display system according to embodiments of the present disclosure.

The type and number of circuit elements constituting each subpixel SP may be variously determined according to a provided function and a design method FIG. 4 is a diagram showing an example of a structure for driving a plurality of display panels in a display system according to embodiments of the present disclosure.

Referring to FIG. 4, the display system 100 according to embodiments of the present disclosure may include one or more display panels 111, 112, 113, a timing controller 140, and one or more source driving integrated circuits SDIC1, SDIC2, SDIC3.

The one or more display panels may be at least one of the first display panel 111, the second display panel 112, and the third display panel 113. The first display panel 111 may be a dashboard display panel, the second display panel 112 may be a center fascia display panel, and the third display panel 113 may be a passenger display panel.

The first source driving integrated circuit SDIC1 may supply a first data voltage to the first display panel 111. The second source driving integrated circuit SDIC2 may supply a second data voltage to the second display panel 112. The third source driving integrated circuit SDIC3 may supply a third data voltage to the third display panel 113.

The timing controller 140 may receive external timing signals such as a vertical synchronization signal Vsync, a horizontal synchronization signal Hsync, a data enable signal DE and main clock MCLK, etc., and image data DATA from the host system through an interface such as low voltage differential signaling LVDS interface.

The timing controller 140 may generate control signals for the operation of the gate driving circuit 120 and the data driving circuit 130 based on the external timing signals, and supply the image data DATA to the source driving integrated circuits SDIC1-SDIC3 constituting the data driving circuit 130.

Meanwhile, the timing controller 140 may receive coordinates of important information from the host system and calculate a checksum to check for errors in the image data DATA based on the coordinates of the important information.

When the display system 100 displays vehicle-related information, the important information may be information for displaying vehicle warnings such as safety control off, temperature caution, anti-lock brake system (ABS), low hydraulic pressure, etc.

The timing controller 140 transmits the coordinates and checksum of important information to the source driving integrated circuits SDIC1-SDIC3, respectively.

After this, the timing controller 140 may receive feedback on whether there is an error in the image data DATA from the source driving integrated circuits SDIC1-SDIC3 through a specific interface. Additionally, the timing controller 140 may also receive feedback on whether there is an error in the communication state from the source driving integrated circuits SDIC1-SDIC3.

Based on the feedback results, the timing controller 140 may determine whether an error has occurred in the communication state or an abnormal image is displayed in the source driving integrated circuits SDIC1-SDIC3.

Each source driving integrated circuit SDIC1-SDIC3 converts the image data DATA received from the timing controller 140 into an analog data voltage and supplies it to corresponding display panel 111-113 through data lines.

The first source driving integrated circuit SDIC1 may supply the data voltage through a data line connected to the first display panel 111, the second source driving integrated circuit SDIC2 may supply the data voltage through a data line connected to the second display panel 112, and the third source driving integrated circuit SDIC3 may supply the data voltage through a data line connected to the third display panel 113.

At this time, first subpixels and second subpixels with different emission angles may be arranged together in at least one display panel 111-113. The display system 100 may control the viewing angle of image by selectively controlling driving operations of the first subpixels or the second subpixels.

Figure 5:
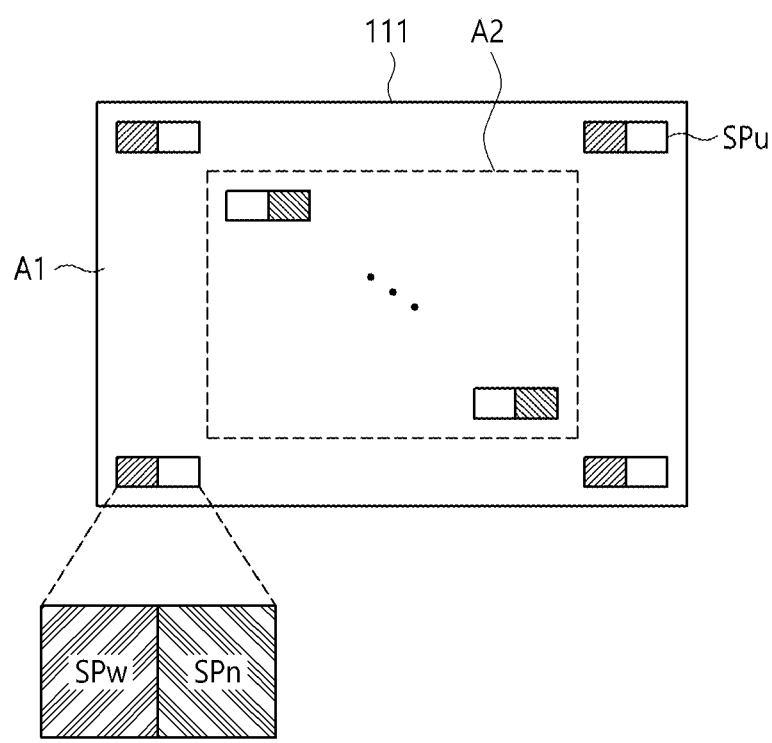
FIG. 5 is a diagram illustrating a display panel including subpixels having different emission angles in a display system according to embodiments of the present disclosure.

FIG. 5 is a diagram illustrating a display panel including subpixels having different emission angles in a display system according to embodiments of the present disclosure.

Referring to FIG. 5, a plurality of unit subpixels SPu may be disposed on the first display panel 111 in the display system 100 according to embodiments of the present disclosure.

Here, the unit subpixel SPu is a subpixel that emits light of a specified color, and may include a first subpixel SPw with a first emission angle and a second subpixel SPn with a second emission angle. The unit subpixel SPu may include a unit subpixel that emits red color, a unit subpixel that emits green color, and a unit subpixel that emits blue color.

The first subpixel SPw may be a wide-angle subpixel with a wide emission angle, and the second subpixel SPn may be a narrow-angle subpixel with a narrow emission angle.

When the first subpixel SPw with a wide emission angle in the unit subpixel SPu disposed on the first display panel 111 emits light, the image of the first display panel 111 is displayed with a wide viewing angle. Therefore, not only the driver but also the passenger in the passenger's seat in the vehicle will be able to recognize the image of the first display panel 111.

On the other hand, when the second subpixel SPn with a narrow emission angle emits light in the unit subpixel SPu disposed on the first display panel 111, the image of the first display panel 111 has a narrow viewing angle. Therefore, only the occupant (e.g., driver) located in front of the first display panel 111 in the vehicle will be able to recognize the image of the first display panel 111.

At this time, the area of the first display panel 111 may be divided and images with different viewing angles may be displayed in each area respectively.

For example, the outer part of the first display panel 111 may be set as a first area A1, and the unit subpixel SPu located in the first area A1 may emit the first subpixel SPw in the first area A1 with a wide emission angle. In this case, the image displayed in the first area A1 may have a wide viewing angle.

On the other hand, the central part of the first display panel 111 may be set as a second area A2, and the unit subpixel SPu located in the second area A2 may emit the second subpixel SPn with a narrow emission angle. In this case, the image displayed in the second area A2 may have a narrow viewing angle.

The size of the second area A2 may be changed based on the center of the first display panel 111. Accordingly, the first area A1 may be a remaining outer area of the first display panel 111 excluding the second area A2.

In this way, the display system 100 of the present disclosure may display images with different viewing angles depending on the location of the first display panel 111 by selectively driving the subpixels SPw, SPn with different emission angles.

At this time, the first subpixel SPw and the second subpixel SPn constituting the unit subpixel SPu may have the same structure (size, number, location, etc.), and may have different structures.

Figure 6:
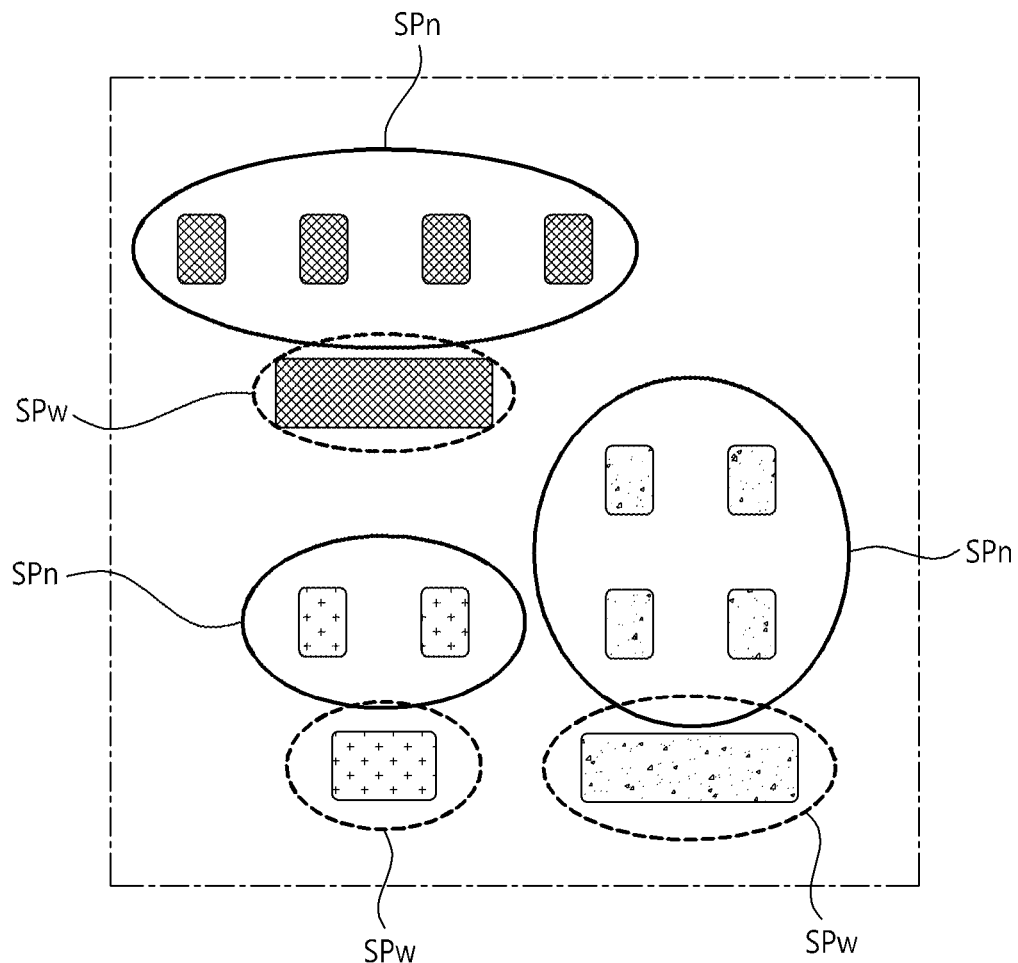
FIG. 6 is a diagram illustrating different structures of the first subpixel and the second subpixel constituting a unit subpixel in the display system according to embodiments of the present disclosure.

FIG. 6 is a diagram illustrating different structures of the first subpixel and the second subpixel constituting a unit subpixel in the display system according to embodiments of the present disclosure.

Referring to FIG. 6, a unit subpixel SPu disposed on the display panel 110 in the display system 100 according to embodiments of the present disclosure may include a first unit subpixel that emits a red color, a second unit subpixel that emits a green color, and a third unit subpixel that emits blue color.

The unit subpixels SPu of each color may include a first subpixel SPw with a wide emission angle and a second subpixel SPn with a narrow emission angle.

At this time, the first subpixel SPw may be different in size, number, or location from the second subpixel SPn.

For example, the first unit subpixel emitting red color may include one first subpixel SPw and two second subpixels SPn. At this time, the size of the first subpixel SPw may be larger than the second subpixel SPn.

Additionally, the second unit subpixel emitting green color may include one first subpixel SPw and four second subpixels SPn. At this time, the four second subpixels SPn may be arranged in a square structure on upper area of the first subpixel SPw.

Additionally, the third unit subpixel emitting blue color may include one first subpixel SPw and four second subpixels SPn. At this time, four second subpixels SPn may be arranged in a row on upper area of the first subpixel SPw.

The size and arrangement of the first subpixel SPw and the second subpixel SPn may be determined according to the luminous efficiency of the corresponding color and the lifetime of the subpixel.

At this time, the emission angles of the first subpixel SPw and the second subpixel SPn may be controlled according to the shape of the lens disposed on a emission surface.

Figure 7:
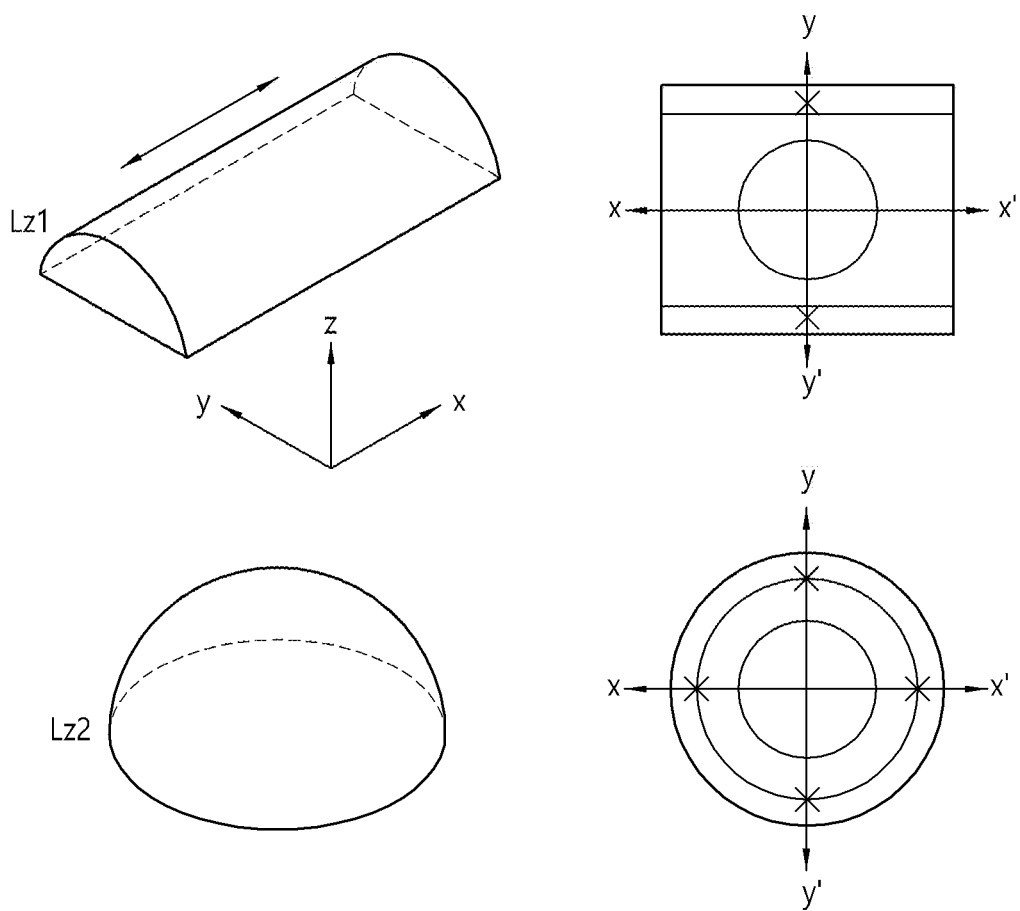
FIG. 7 is a diagram illustrating a first lens disposed on a first subpixel and a second lens disposed on a second subpixel in the display system according to embodiments of the present disclosure.

FIG. 7 is a diagram illustrating a first lens disposed on a first subpixel and a second lens disposed on a second subpixel in the display system according to embodiments of the present disclosure.

Referring to FIG. 7, the first lens Lz1 disposed on the first subpixel SPw with a wide emission angle may be a semi-cylindrical lens, and the second lens Lz2 disposed on the second subpixel SPn with a narrow emission angle may be a semi-spherical lens in the unit subpixel of the display system 100 according to an embodiment of the present disclosure.

The first lens Lz1 and the second lens Lz2 may have different shapes and different sizes, but may have the substantially same thickness (height).

The first lens Lz1 and the second lens Lz2 may have different shapes, different sizes, and different thicknesses (heights).

The first lens Lz1 may have a semi-cylindrical shape with a rectangular bottom face. Thus, a light-emitting direction thereof may be cut off in a y-y' direction and may not be cut off in a x-x' direction.

That is, because the first lens Lz1 has a length that exceeds a width of the first subpixel SPw in an x-axis direction, the first lens Lz1 is not cut off in the x-x' direction. The first lens Lz1 has a curvature and a width thereof in the x-x' direction is smaller as it extends upward along the z-axis. Thus, the first lens Lz1 is cut off in the y-y' direction.

The second lens Lz2 is a semi-spherical type with a circular bottom face. The second lens Lz2 has a curvature, and a width h thereof in each of the x-x' direction and the y-y' direction is smaller as it extends upward along the z-axis.

Therefore, the light-emitting direction may be cut off from the circular bottom face and by a width of the second subpixel SPn in all of the x-x' direction and in the y-y' direction.

A size of each of subpixels SPw, SPn, the first lens Lz1, and the second lens Lz2 may vary according to an angle to cut off the light.

Further, the size of each of subpixels SPw, SPn, the first lens Lz1, and the second lens Lz2 may vary according to light efficiency and light concentration of the subpixels SPw, SPn.

Figure 8:
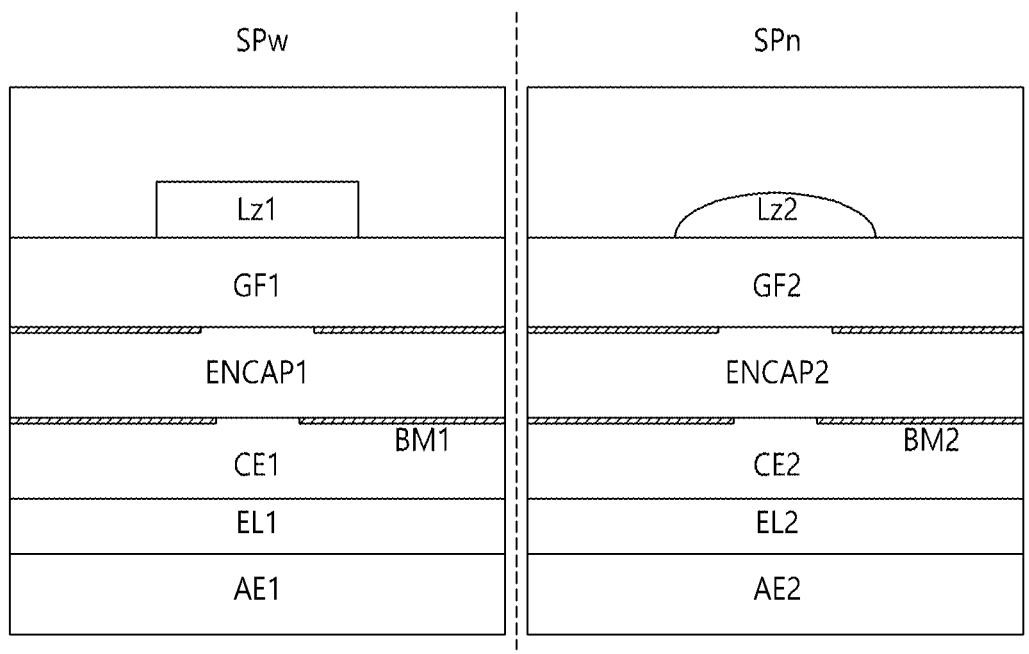
FIG. 8 is a cross-sectional diagram of a unit subpixel in a display system according to embodiments of the present disclosure.

FIG. 8 is a cross-sectional diagram of a unit subpixel in a display system according to embodiments of the present disclosure.

Referring to FIG. 8, the unit subpixel disposed on the display panel 110 in the display system 100 according to embodiments of the present disclosure may include a first subpixel SPw with a first emission angle and a second subpixel SPn with a second emission angle.

The first emission angle emitted through the first subpixel SPw may be greater than the second emission angle emitted through the second subpixel SPn.

The first subpixel SPw may include a first anode electrode AE1, a first emission layer EL1, and a first cathode electrode CE1. The first anode electrode AE1, the first emission layer EL1, and the first cathode electrode CE1 may constitute a first light-emitting element.

Additionally, a first black matrix BM1, a first insulating layer ENCAP1, a first gap filler GF1, and a first lens Lz1 with a first emission angle may be stacked sequentially on the first cathode electrode CE1. An auxiliary gap filler may be additionally disposed on the first lens Lz1.

Here, a portion of the area of the first black matrix BM1 overlapping with the first anode electrode AE1 may be open.

The second subpixel SPn may include a second anode electrode AE2, a second emission layer EL2, and a second cathode electrode CE2. The second anode electrode AE2, the second emission layer EL2, and the second cathode electrode CE2 may constitute a second light-emitting element.

Additionally, a second black matrix BM2, a second insulating layer ENCAP2, a second gap filler GF2, and a second lens Lz2 with a second emission angle may be stacked sequentially on the second cathode electrode CE2. An auxiliary gap filler may be additionally disposed on the second lens Lz2.

A portion of the area of the second black matrix BM2 overlapping with the second anode electrode AE2 may be open.

The first black matrix BM1 and the second black matrix BM2 may prevent light from being incident to the active layer of a driving transistor constituting a subpixel to prevent leakage current from being generated.

The first anode electrode AE1 of the first subpixel SPw and the second anode electrode AE2 of the second subpixel SPn may be formed in the same process, on the same layer, with the same material, and with the substantially same thickness. The first anode electrode AE1 and the second anode electrode AE2 may be formed through a mask process using photoresist.

The first emission layer EL1 of the first subpixel SPw and the second emission layer EL2 of the second subpixel SPn may be formed with the same material, same color, and same thickness on the same layer through a same process.

Each of the first emission layer EL1 and the second emission layer EL2 may include a hole injecting layer (HIL), a hole transporting layer (HTL), a emitting material layer (EML), an electron transporting layer (ETL), and an electron injecting layer (EIL).

The first cathode electrode CE1 of the first subpixel SPw and the second cathode electrode CE2 of the second subpixel SPn may be formed with the same material, same color, and same thickness on the same layer through a same process.

The first cathode electrode CE1 and the second cathode electrode CE2 may be made of an opaque metal material, such as at least one selected from a group of aluminum (Al), tungsten (W), copper (Cu), molybdenum (Mo), chromium. (Cr), tantalum (Ta), titanium (Ti), and alloys formed from combinations thereof.

The first gap filler GF1 of the first subpixel SPw and the second gap filler GF2 of the second subpixel SPn may be formed with the same material, same color, and same thickness on the same layer through a same process.

A space between the first emission layer EL1 and the first lens Lz1 may be adjusted based on the thickness (height) of the first gap filler GF1. Further, a space between the second emission layer EL2 and the second lens Lz2 may be adjusted based on the thickness (height) of the second gap filler GF2.

The first gap filler GF1 or the second gap filler GF2 may be made of one of acrylic, epoxy, and silicon or combinations thereof. Further, the first gap filler GF1 or the second gap filler GF2 may be made of an organic material.

A particle size in the first gap filler GF1 or the second gap filler GF2 may be equal to a wavelength of light, or may be larger or smaller than the wavelength of light by a certain range. The first gap filler GF1 or the second gap filler GF2 may have forward diffusion property based on one of a particle density, a particle size, and a particle shape.

In this connection, the first gap filler GF1 or the second gap filler GF2 may have a smaller refractive index than that of the first insulating layer ENCAP1. That is, the first gap filler GF1 and the second gap filler GF2 may have a smaller refractive index than that of the first insulating layer ENCAP1 due to one of the particle density, size, and shape.

A material of the first insulating layer ENCAP1 or the second insulating layer ENCAP2 may be one of TiO2, Al2O3, and SiO2.

When the material of the first insulating layer ENCAP1 or the second insulating layer ENCAP2 is TiO2, the first insulating layer ENCAP1 or the second insulating layer ENCAP2 may have a refractive index in a range of 2.6 to 2.9. When the material of the first insulating layer ENCAP1 or the second insulating layer ENCAP2 is Al2O3, the first insulating layer ENCAP1 or the second insulating layer ENCAP2 may have a refractive index in a range of 1.75 to 1.76. When the material of the first insulating layer ENCAP1 or the second insulating layer ENCAP2 is SiO2, the first insulating layer ENCAP1 or the second insulating layer ENCAP2 may have a refractive index in a range of 1.40 to 1.55.

The first lens Lz1 of the first subpixel SPw and the second lens Lz2 of the second subpixel SPn may be formed with the same material, same color, and same thickness on the same layer through a same process. However, the first lens Lz1 and the second lens Lz2 may be formed to have different shapes and different sizes.

The refractive indices of the first lens Lz1 and the second lens Lz2 may be determined according to shapes of the lens and thicknesses (heights) of the gap filler GF1, GF2.

Figure 9:
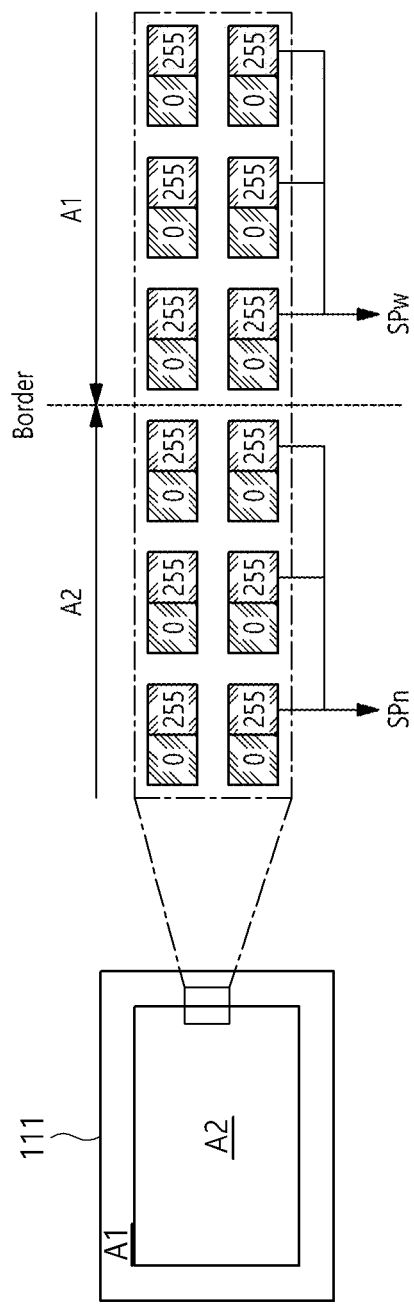
FIG. 9 is a diagram illustrating a case where different images are displayed in the first area and the second area of the display panel in the display system according to embodiments of the present disclosure.
Figure 10:
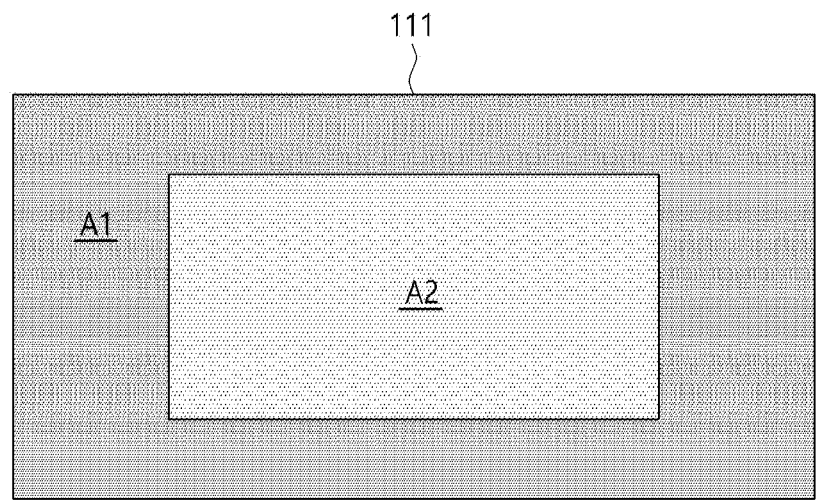
FIG. 10 is a diagram illustrating a degradation state when different images are displayed in the first area and the second area of the display panel in the display system according to embodiments of the present disclosure.

FIG. 9 is a diagram illustrating a case where different images are displayed in the first area and the second area of the display panel in the display system according to embodiments of the present disclosure. Also, FIG. 10 is a diagram illustrating a degradation state when different images are displayed in the first area and the second area of the display panel in the display system according to embodiments of the present disclosure.

At first, referring to FIG. 9, the display system 100 according to embodiments of the present disclosure may include a plurality of display panels (e.g., first display panel to third display panel). At least one display panel (e.g., the first display panel) may be driven to a plurality of areas (e.g., the first area and the second area) with different viewing angles.

For example, the first area A1 of the first display panel 111 may display with a wide viewing angle because the first subpixel SPw with a wide emission angle in the unit subpixel SPu emits light. Accordingly, not only the driver in the vehicle but also the passenger in the passenger's seat will be able to recognize the image of the first display panel 111.

On the other hand, the second area A2 of the first display panel 111 may display with a narrow viewing angle because the second subpixel SPn with a narrow emission angle in the unit subpixel SPu emits light. Accordingly, only the driver located I front of the first display panel 111 in the vehicle will be able to recognize the image of the first display panel 111.

At this time, the size of the first area A1 with a narrow viewing angle may be variable.

However, when the first subpixel SPw emits light in the first area A1 and the second subpixel SPn emits light in the second area A2 for a long period of time, there is a deviation in the degree of degradation of the first area A1 and the degree of degradation of the second area A2.

As a result, as shown in FIG. 10, a problem may occur in which luminance deviation is recognized at the boundary between the first area A1 and the second area A2.

The display system 100 of the present disclosure may reduce image defects caused by luminance deviation by reducing the degradation deviation between the first area A1 and the second area A2.

For the above purpose, the display system 100 of the present disclosure may reduce the degradation deviation between the first area A1 and the second area A2 by controlling the emission cycle of the first subpixel SPw and the second subpixel SPn at the boundary between the first area A1 and the second area A2 with different viewing angles.

Figure 11:
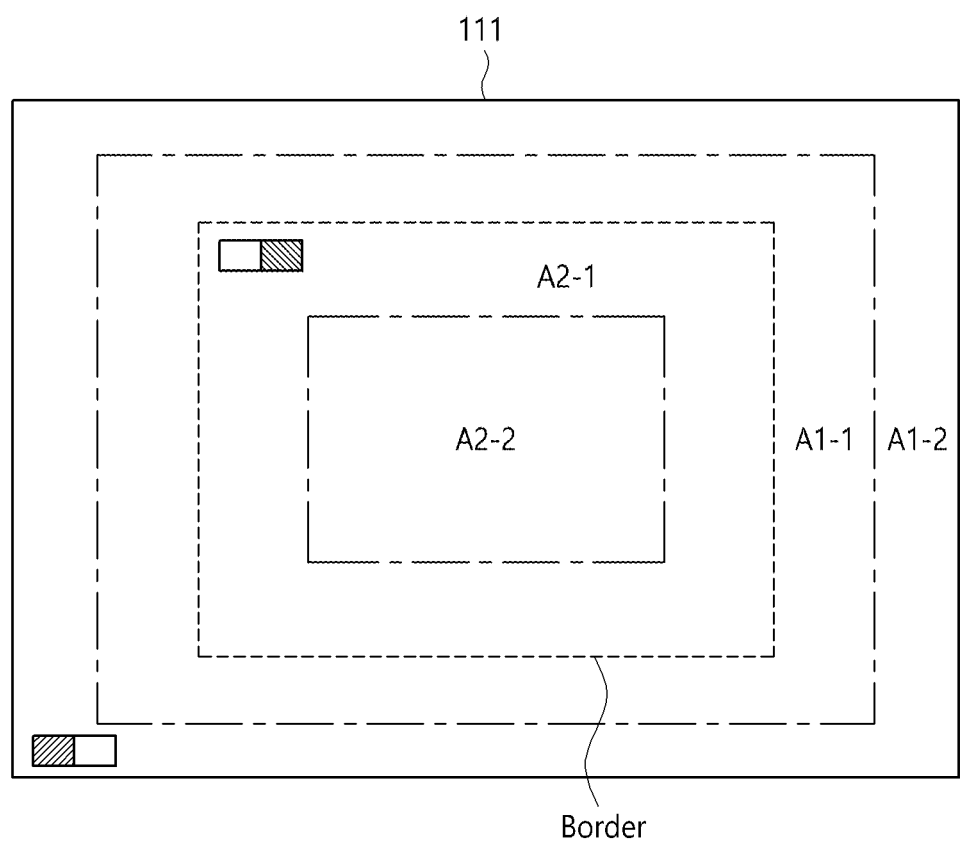
FIG. 11 is a diagram illustrating a case that controls the emission cycle of a first area and a second area with different viewing angles in a display system according to embodiments of the present disclosure.

FIG. 11 is a diagram illustrating a case that controls the emission cycle of a first area and a second area with different viewing angles in a display system according to embodiments of the present disclosure.

Referring to FIG. 11, the display system 100 of the present disclosure may reduce the degradation deviation of the display panel by controlling the emission cycle of subpixels in an area with a high degradation deviation in relation with the first area A1 and the second area A2 displaying images at different viewing angles.

For example, the first area A1 of the first display panel 111 may exhibit a wide viewing angle by emitting the first subpixels SPw with a wide emission angle in the unit subpixel SPu. The second area A2 of the first display panel 111 may exhibit a narrow viewing angle by emitting the second subpixels SPn with a narrow emission angle in the unit subpixel SPu.

In this case, because the first subpixel SPw emits light in the first area A1 and the second subpixel SPn emits light in the second area A2 for a long time, the deviation between the degree of degradation in the first area A1 and the degree of degradation in the second area A2 increases.

Therefore, an area close to the border may be set as an emission cycle control area based on the border between the first area A1 and the second area A2.

For example, the 1-1 area A1-1 close to the border among the first area A1, and the 2-1 area A2-1 close to the border among the second area A2 may be set as the emission cycle control area.

The emission cycle control area may include two or more subpixel lines from the border.

The 1-2 area A1-2 other than the 1-1 area A1-1 corresponding to the emission cycle control area among the first area A1 may be an emission area in which the emission cycle is not variable.

Likewise, the 2-2 area A2-2 other than the 2-1 area A2-1 corresponding to the emission cycle control area among the second area A2 may be an emission area in which the emission cycle is not variable.

The display system 100 of the present disclosure may control gate signals generated in the gate driving circuit 120 to control the emission cycle of the subpixel located in the emission cycle control area.

Figure 12:
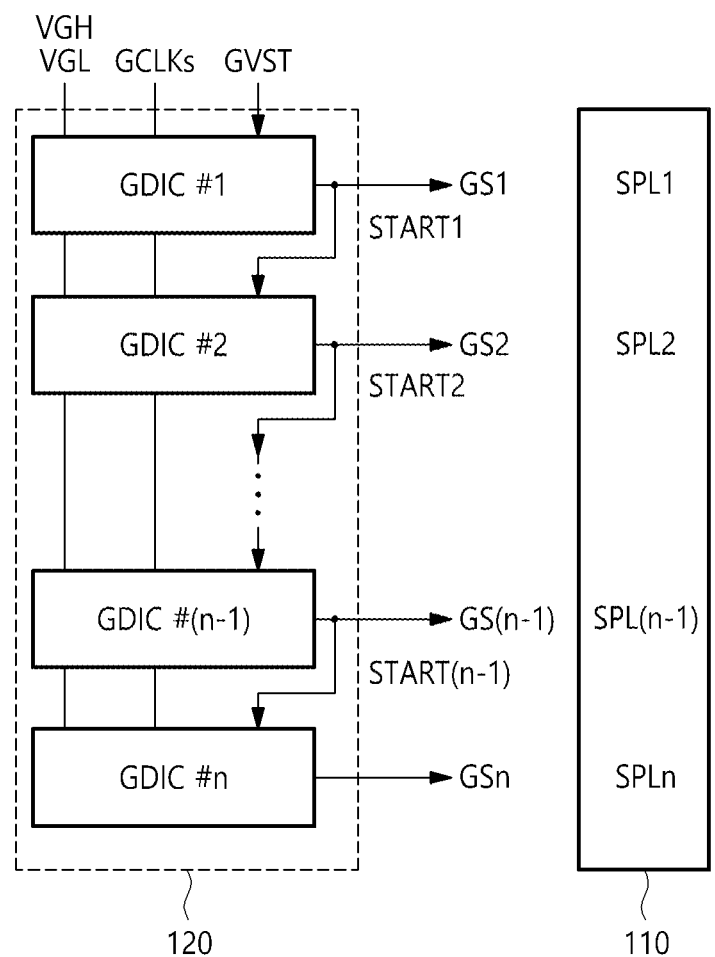
FIG. 12 is a block diagram illustrating a configuration of a gate driving circuit in a display system according to embodiments of the present disclosure.

FIG. 12 is a block diagram illustrating a configuration of a gate driving circuit in a display system according to embodiments of the present disclosure.

Referring to FIG. 12, the gate driving circuit 120 in the display system 100 according to embodiments of the present disclosure may be disposed in the side bezel area of the display panel 110.

The gate driving circuit 120 may be composed of n stages STG1-STGn to which n (a natural number of 2 or more) gate driving integrated circuits GDIC #1-GDIC #n are dependently connected. Each of the gate driving integrated circuits GDIC #1-GDIC #n receives a gate high voltage VGH and a gate low voltage VGL as driving voltages, and are operated by gate clock signals GCLKs.

A first gate driving integrated circuit GDIC #1 starts operation by a gate start signal GVST, and a second gate driving integrated circuit GDIC #2 to the nth gate driving integrated circuit GDIC #n may receive gate signals GS1-GS (n−1) output from previous output terminals as start signals.

For example, a first gate signal GS1 output from the output terminal of the first gate driving integrated circuit GDIC #1 corresponding to the first stage STG1 may be supplied to a first subpixel line SPL1 disposed in the first row and a start signal input terminal of the second gate driving integrated circuit GDIC #2 of the second stage STG2.

Accordingly, the first gate driving integrated circuit GDIC #1 of the first stage STG1 may use the gate start signal GVST as a start signal, but each of the second gate driving integrated circuit GDIC #2 of the second stage STG2 to the nth gate driving integrated circuit GDIC #n of the nth stage STGn may use the gate signal output from the output terminal of the previous gate driving integrated circuit as a start signal.

Here, the expression that first gate signal GS1 output from the output terminal of the first gate driving integrated circuit GDIC #1 is the first start signal START1 is to show that the first gate signal GS1 generated in the first stage STG1 is used as a start signal for the next stage.

Dependently connected stages and the configuration of using the gate signal of the front stage as the start signal of the next stage may be applied equally to all stages STG1-STGn as shown in the relationship between the (n−1)th stage STG (n−1) and the nth stage STGn.

Meanwhile, a gate signal output from one stage (one gate driving integrated circuit) may include one or more scan signals and one or more emission signals. For example, two scan signals and one emission signal may be generated from one stage (one gate driving integrated circuit).

Additionally, the gate driving circuit 120 in the display system 100 of the present disclosure may additionally generate an emission cycle control signal for controlling emission cycles in areas close to a border between the first area A1 with the first emission angle and the second area A2 with the second emission angle.

Figure 13:
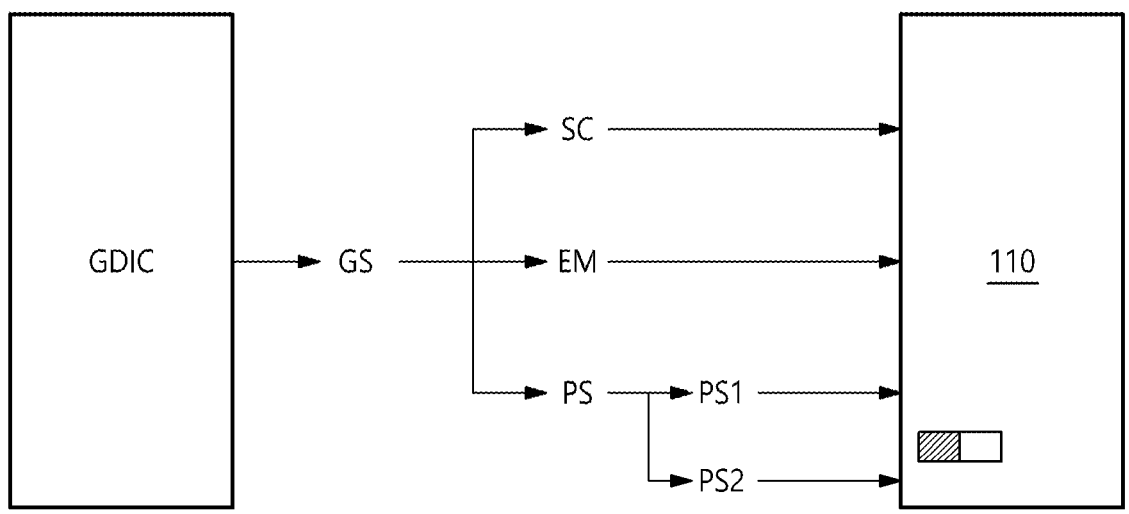
FIG. 13 is a diagram illustrating a gate signal output from a gate driving circuit in a display system according to embodiments of the present disclosure.

FIG. 13 is a diagram illustrating a gate signal output from a gate driving circuit in a display system according to embodiments of the present disclosure.

Referring to FIG. 13, each of a plurality of gate driving integrated circuits GDIC constituting the gate driving circuit 120 in the display system 100 according to embodiments of the present disclosure may generate a gate signal to drive subpixels of the display panel 110.

At this time, the gate signal GS output from the gate driving integrated circuit GDIC may include a scan signal SC controlling the driving timing of the subpixel, an emission signal EM controlling the emission timing of the subpixel, and a cycle control signal PS controlling the emission cycle of predetermined subpixel.

The scan signal SC may include one or more scan signals depending on the circuit configuration of the subpixel.

The emission signal EM may include one or more emission signals depending on the circuit configuration of the subpixel.

The cycle control signal PS may include a first cycle control signal PS1 that controls the emission cycle of the first subpixel SPw with a first emission angle, and a second cycle control signal PS2 that controls the emission cycle of the second subpixel SPn with a second emission angle.

Figure 14:
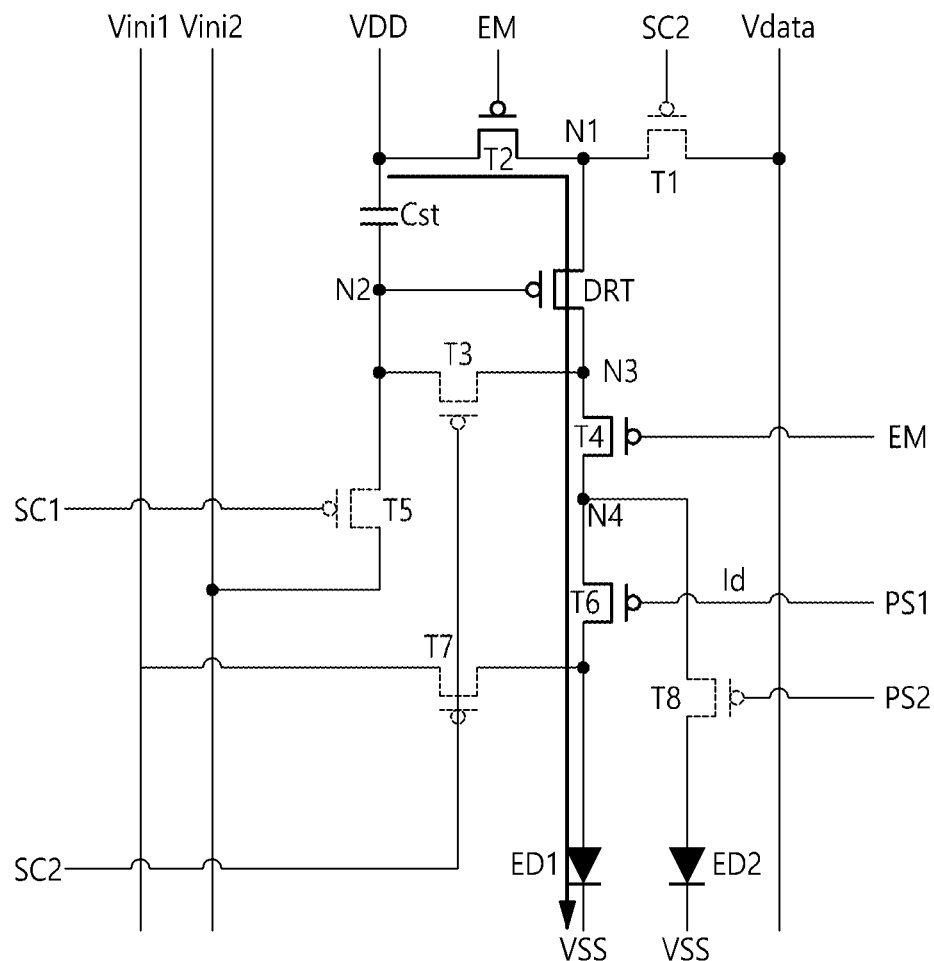
FIG. 14 is a diagram illustrating a circuit operation in which the first subpixel of a unit subpixel emits light in a display system according to embodiments of the present disclosure.
Figure 15:
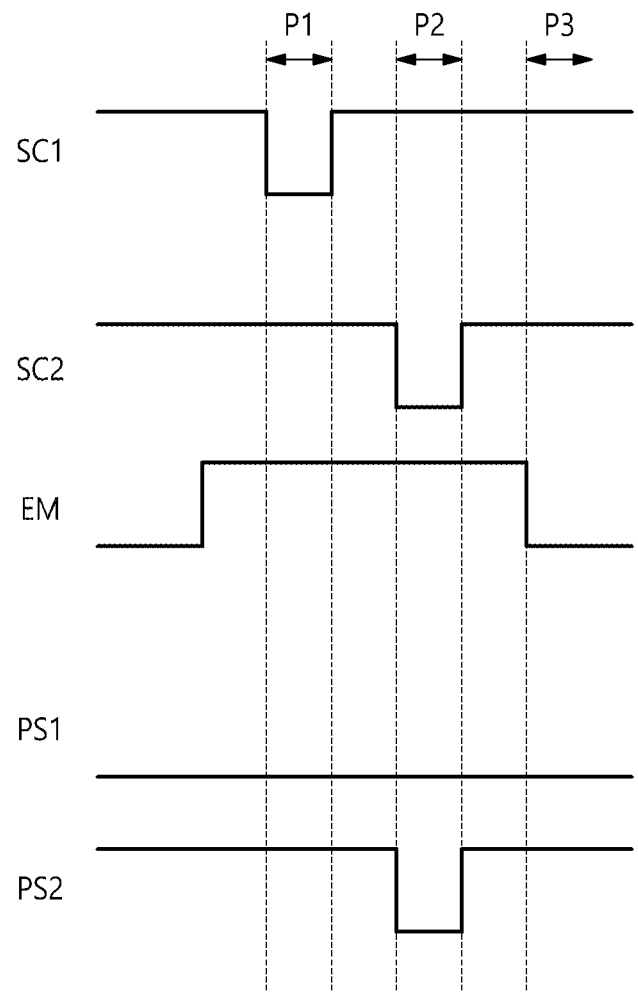
FIG. 15 is a diagram of signal waveforms driven by the first subpixel of a unit subpixel in a display system according to embodiments of the present disclosure.

FIG. 14 is a diagram illustrating a circuit operation in which the first subpixel of a unit subpixel emits light in a display system according to embodiments of the present disclosure, and FIG. 15 is a diagram of signal waveforms driven by the first subpixel of a unit subpixel in a display system according to embodiments of the present disclosure.

Referring to FIGS. 14 and 15, a unit subpixel according to embodiments of the present disclosure may include a first light-emitting element ED1, a second light-emitting element ED2, a driving transistor DRT, and an internal compensation circuit.

Here, the first light-emitting element ED1 may be placed in the first subpixel SPw, and the second light-emitting element ED2 may be placed in the second subpixel SPn.

The first lens Lz1 may be located on the first light-emitting element ED1, and the second lens Lz2 may be located on the second light-emitting element ED2.

The transistors T1-T8, DRT disposed in unit subpixel may be implemented as PMOS type LTPS (Low Temperature Poly Silicon) transistors, and the desired response characteristics may be obtained from these.

For example, at least one transistor among the switching transistors T1-T8 may be implemented as an NMOS type or PMOS type oxide transistor with good characteristics for leakage current when turned off, and the remaining transistors may be implemented as a PMOS type LTPS transistor with good response characteristics.

The unit subpixel may include a first transistor T1 which is connected to the data line and transmits the data voltage Vdata by the second scan signal SC2.

The unit subpixel may include a second transistor T2 which is connected to a driving voltage VDD and transmits the driving voltage VDD by the emission signal EM.

The driving transistor DRT connects the first node N1 shared by the first transistor T1 and the second transistor T2 to the third node N3, and receives the voltage charged in the storage capacitor Cst through the second node N2 as the gate voltage.

A fourth transistor T4 controlled by the emission signal EM and a sixth transistor T6 controlled by the first cycle control signal PS1 are connected between the third node N3 and the first light-emitting element ED1.

A fourth transistor T4 controlled by the emission signal EM and a eighth transistor T8 controlled by the second cycle control signal PS2 are connected between the third node N3 and the second light-emitting element ED2. The eighth transistor T8 is connected to a fourth node N4 of the fourth transistor T4.

Accordingly, the first light-emitting element ED1 or the second light-emitting element ED2 may emit light by the first cycle control signal PS1 and the second cycle control signal PS2 in a state in which the fourth transistor T4 is turned on by the emission signal EM.

A third transistor T3 controlled by the second scan signal SC2 may connect the second node N2 to the third node N3.

The fifth transistor T5 is connected between the second node N2 and a line supplying the second initialization voltage Vini2, and may be controlled by the first scan signal SC1. Accordingly, the fifth transistor T5 may initialize the gate node of the driving transistor DRT to the second initialization voltage Vini2 by the first scan signal SC1.

The seventh transistor T7 is connected between the anode electrode of the first light-emitting element ED1 and a line supplying the first initialization voltage Vini1, and may be controlled by the second scan signal SC2. Accordingly, the seventh transistor T7 may initialize the anode electrode of the first light-emitting element ED1 to the first initialization voltage Vini1 by the second scan signal SC2.

At this time, the first to eighth transistors T1-T8 may be referred to as the first to eighth switching transistors, respectively.

The first light-emitting element ED1 and the second light-emitting element ED2 emit light with an amount of current controlled by the voltage Vgs between the gate node and source node of the driving transistor DRT.

The first light-emitting element ED1 may be connected to the driving transistor DRT through the fourth transistor T4 and the sixth transistor T6. The second light-emitting element ED2 may be connected to the driving transistor DRT through the fourth transistor T4 and the eighth transistor T8.

The cathode electrodes of the first light-emitting element ED1 and the second light-emitting element ED2 are connected to the low potential voltage VSS.

The driving transistor DRT may control a driving current Id flowing through the first light-emitting element ED1 or the second light-emitting element ED2 according to the voltage Vgs between the gate node and the source node.

The compensation circuit may sample the voltage Vgs between the gate node and the source node of the driving transistor DRT to compensate for the change in threshold voltage of the driving transistor DRT. The compensation circuit may include first to eighth transistors T1-T8 and a storage capacitor Cst. Alternatively, the remainder excluding the first transistor T1 for supplying the data voltage Vdata may be referred to as the compensation circuit.

Accordingly, the unit subpixel constituting the display system 100 of the present disclosure may control the emission cycle of the first light-emitting element ED1 by the first cycle control signal PS1 and may control the emission cycle of the second light-emitting element ED2 by the second cycle control signal PS2.

For example, the first cycle control signal PS1 is supplied at a turn-on level (e.g., low level) and the second cycle control signal PS2 is supplied at a turn-off level (e.g., high level) in a period in which the first light-emitting element ED1 emits light.

Referring to FIG. 15, the gate node of the driving transistor DRT is initialized to the second initialization voltage Vini2 by the first scan signal SC1 in the first period P1.

In the second period P2, the data voltage Vdata is supplied to the driving transistor DRT by the second scan signal SC2, and the anode electrode of the first light-emitting element ED1 may be initialized with the first initialization voltage Vini1.

In the third period P3, the first light-emitting element ED1 emits light by the first cycle control signal PS1, and the second light-emitting element ED2 turns off by the second cycle control signal PS2.

Figure 16:
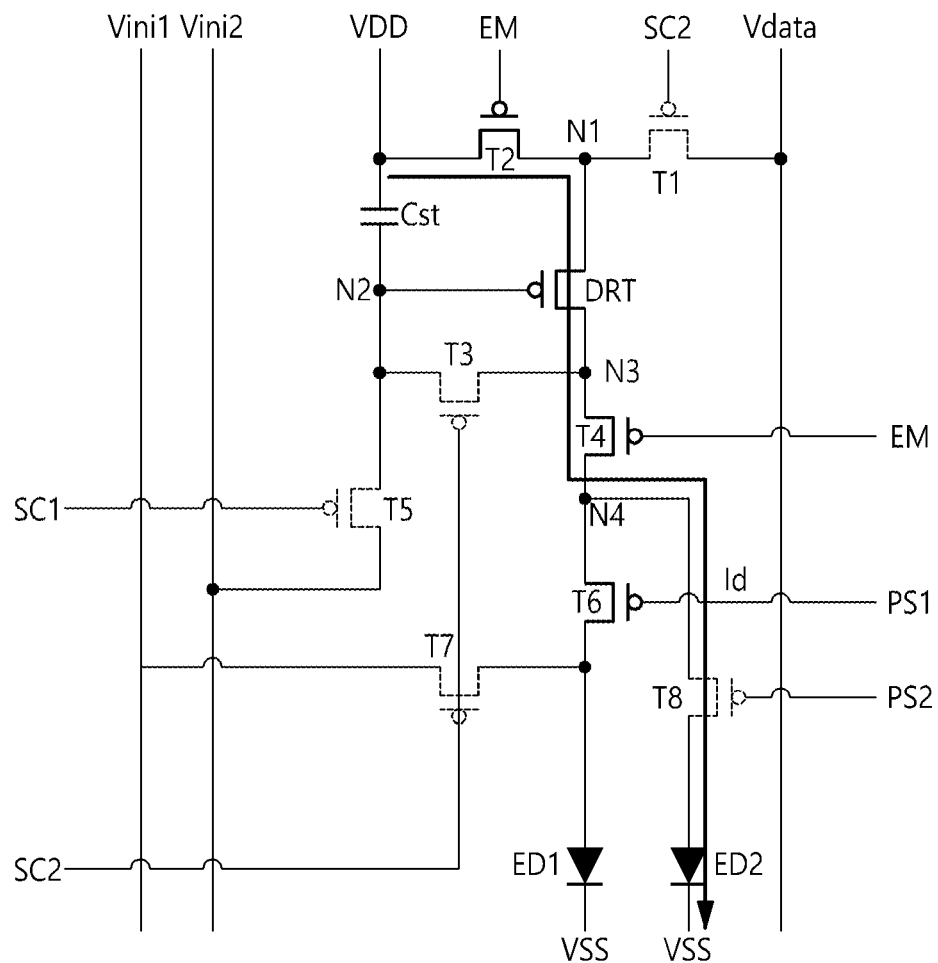
FIG. 16 is a diagram illustrating a circuit operation in which the second subpixel of a unit subpixel emits light in a display system according to embodiments of the present disclosure.
Figure 17:
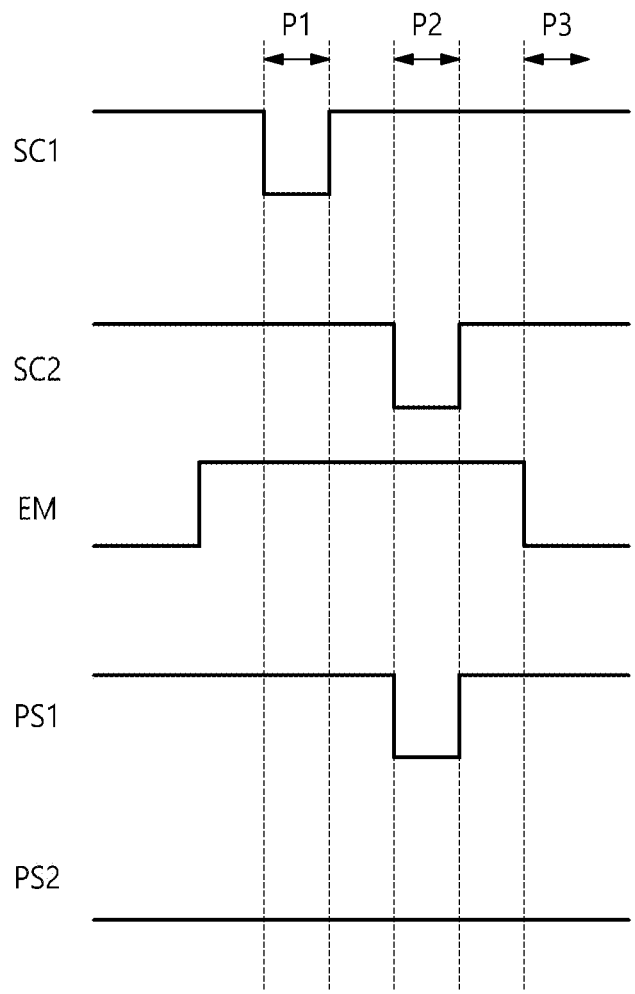
FIG. 17 is a diagram of signal waveforms driven by the second subpixel of a unit subpixel in a display system according to embodiments of the present disclosure.

FIG. 16 is a diagram illustrating a circuit operation in which the second subpixel of a unit subpixel emits light in a display system according to embodiments of the present disclosure, and FIG. 17 is a diagram of signal waveforms driven by the second subpixel of a unit subpixel in a display system according to embodiments of the present disclosure.

Since FIG. 16 is the same as the configuration of FIG. 14, description of the configuration will be omitted.

However, in a period which emits the second light-emitting element ED2, the second cycle control signal PS2 may be supplied at a turn-on level (for example, low level) and the first cycle control signal PS1 may be supplied at a turn-off level (e.g., high level).

Referring to FIG. 17, the gate node of the driving transistor DRT is initialized to the second initialization voltage Vini2 by the first scan signal SC1 in the first period P1.

In the second period P2, the data voltage Vdata may be supplied to the driving transistor DRT by the second scan signal SC2, and the anode electrode of the first light-emitting element ED1 may be initialized with the first initialization voltage Vini1.

In the third period P3, the second light-emitting element ED2 emits light by the second cycle control signal PS2, and the first light-emitting element ED1 turns off by the first cycle control signal PS1.

Figure 18:
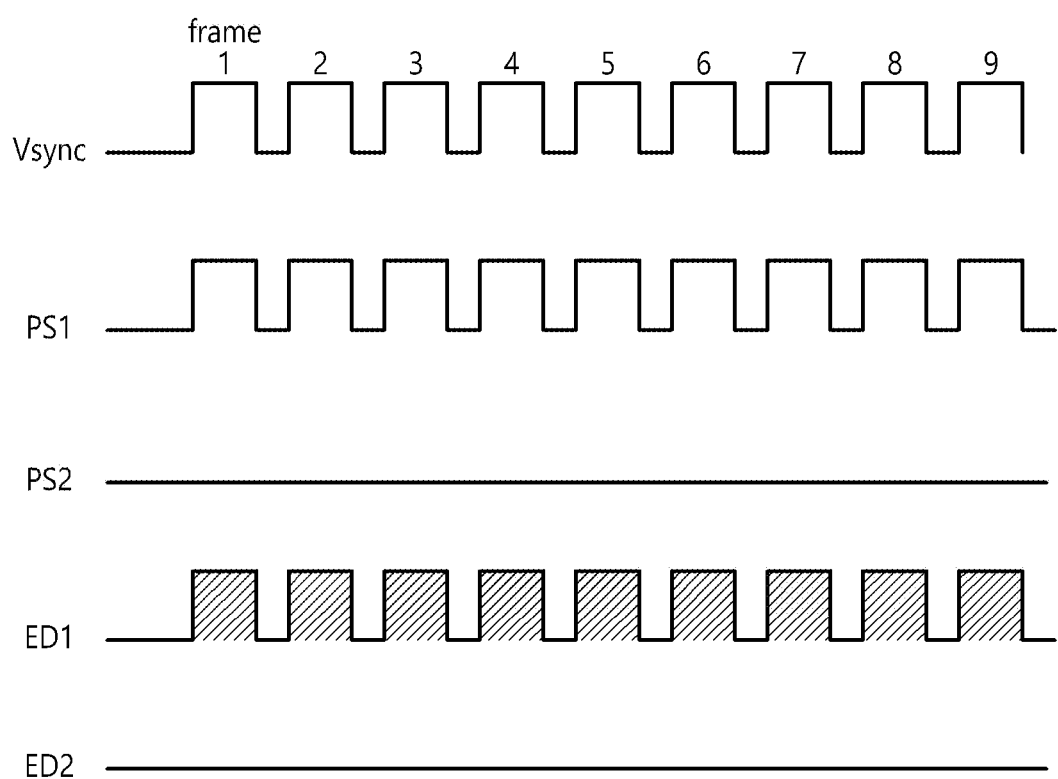
FIGS. 18 to 20 are diagrams illustrating cycle control signals and emission states depending on the area of the display panel in the display system according to embodiments of the present disclosure.
Figure 19:
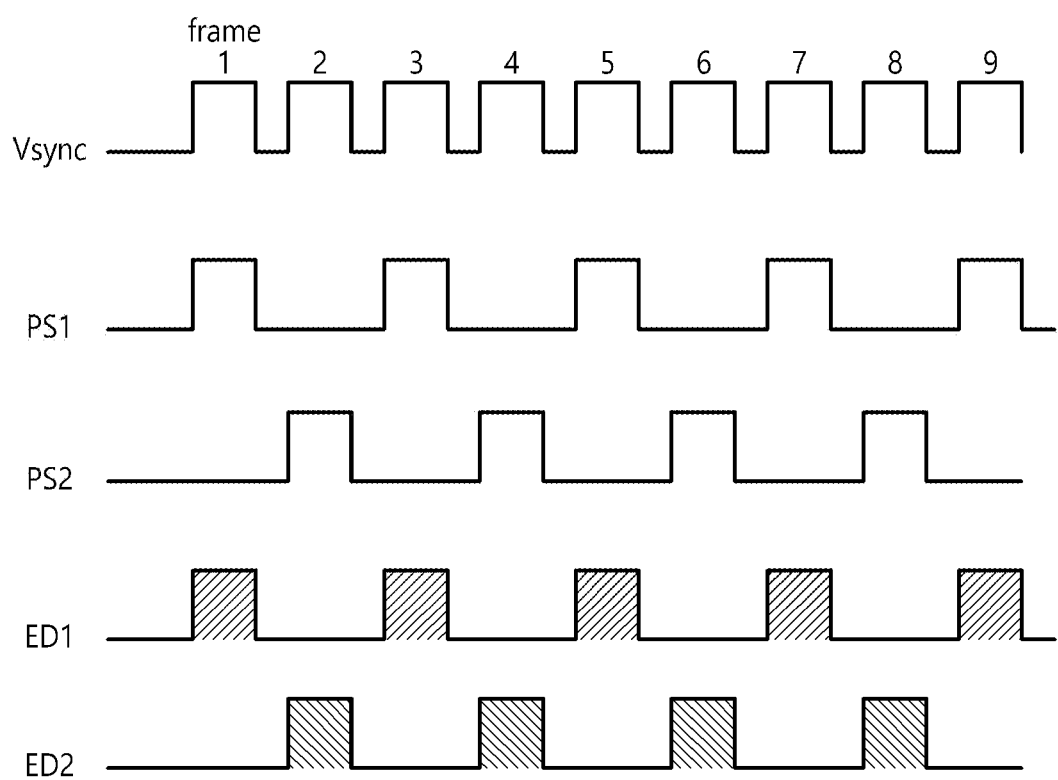
Figure 20:
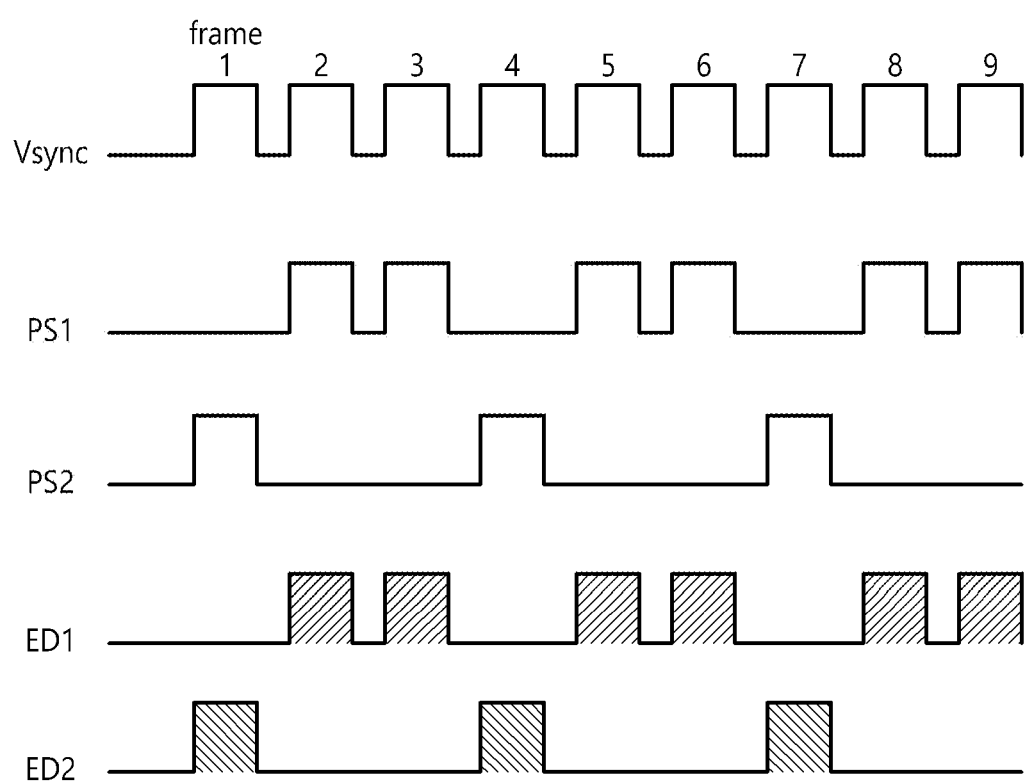

FIGS. 18 to 20 are diagrams illustrating cycle control signals and emission states depending on the area of the display panel in the display system according to embodiments of the present disclosure.

Referring to FIGS. 18 to 20, at least one display panel 110 in the display system 100 according to embodiments of the present disclosure may have a emission cycle control area close to the border between the first area A1 with a first emission angle and the second area A2 with a second emission angle.

For example, the 1-1 area A1-1 close to the border among the first area A1, and the 2-1 area A2-1 close to the border in the second area A2 may be set as the emission cycle control area.

On the other hand, the 1-2 area A1-2 other than the 1-1 area A1-1 whose emission cycle is variable in the first area A1 may be a fixed emission area.

Likewise, the 2-2 area A2-2 other than the 2-1 area A2-1 whose emission cycle is variable among the second area A2 may be a fixed emission area.

FIG. 18 illustrates the signals supplied to the 1-2 area A1-2 where the first light-emitting element ED1 constantly emits light in the first area A1 and emission states of that.

For reference, it illustrates the case where the high level signal is the turn-on level for convenience of understanding.

Referring to FIG. 18, the 1-2 area A1-2 of the display panel 110 corresponds to a fixed emission area where the first light-emitting element ED1 emits light at a first emission angle.

The first cycle control signal PS1 with turn-on level that turns on the first light-emitting element ED1 is supplied to the 1-2 area A1-2 at every frame according to a vertical synchronization signal Vsync that defines the frame. On the other hand, the second cycle control signal PS2 maintains turn-off level.

Accordingly, the first light-emitting element ED1 emits light at every frame, and the second light-emitting element ED2 maintains the turn-off state.

Likewise, the second cycle control signal PS2 with turn-on level that turns on the second light-emitting element ED2 is supplied to the 2-2 area A2-2 where the second light-emitting element ED2 constantly emits light at every frame, and the first cycle control signal PS1 maintains the turn-off level.

FIG. 19 illustrates the signal supplied to the 1-1 area A1-1 close to the border in the first area A1 and the emission states.

Referring to FIG. 19, the 1-1 area A1-1 of the display panel 110 corresponds to an area close to the second area A2 where the second light-emitting element ED2 emits light.

Therefore, because the first light-emitting element ED1 and the second light-emitting element ED2 emit light alternately in the 1-1 area A1-1, the degradation deviation with respect to the second area A2 may be reduced.

At this time, the cycle of alternately emitting the first light-emitting element ED1 and the second light-emitting element ED2 may be variable depending on the distance from the border. For example, the emission cycle of the first light-emitting element ED1 may increase as the distance from the border in the 1-1 area A1-1 increases.

In this case, the user can naturally perceive the luminance change close to the border, and the luminance degradation close to the border can be gradually reduced.

FIG. 19 illustrates a case where the first light-emitting element ED1 and the second light-emitting element ED2 alternately emit light with a ratio of 1:1.

In this case, the first cycle control signal PS1 with turn-on level for the first light-emitting element ED1 may be supplied at every odd frame according to the vertical synchronization signal Vsync that defines the frame. On the other hand, the second cycle control signal PS2 with turn-on level may be supplied at every even frame.

Accordingly, the first light-emitting element ED1 and the second light-emitting element ED2 alternately emit light for each frame.

FIG. 20 illustrates a case where the first light-emitting element ED1 and the second light-emitting element ED2 alternately emit light with a ratio of 2:1.

In this case, according to the vertical synchronization signal Vsync defining the frame, the first cycle control signal PS1 that turns on the first light-emitting element ED1 may be continuously supplied at the turn-on level for two frames, and may be supplied at the turn-off level during one subsequent frame. On the other hand, the second cycle control signal PS2 may be supplied at a turn-on level for each frame as the first cycle control signal PS1 is supplied at a turn-off level.

Accordingly, the first light-emitting element ED1 and the second light-emitting element ED2 alternately emit light in frames with a 2:1 ratio.

In this way, because the rate at which the first light-emitting element ED1 emits increases as the first light-emitting element ED1 far away from the border to the first area A1, the degradation deviation may be reduced while naturally maintaining the luminance change.

Figure 21:
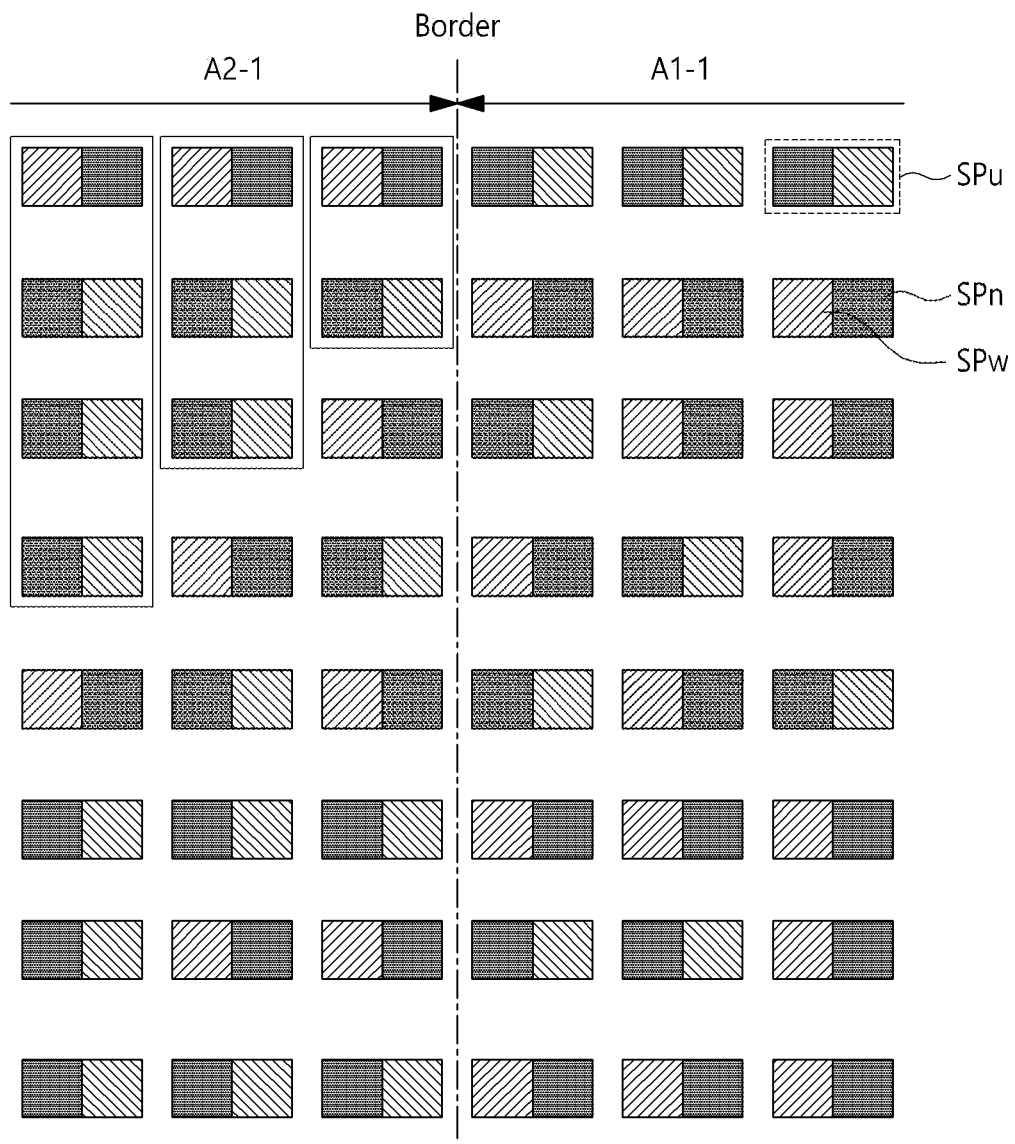
FIG. 21 is a diagram illustrating a variation of the emission cycle at close to the border between the first area and the second area in the display system according to embodiments of the present disclosure.

FIG. 21 is a diagram illustrating a variation of the emission cycle at close to the border between the first area and the second area in the display system according to embodiments of the present disclosure.

Referring to FIG. 21, at least one display panel 110 in the display system 100 according to embodiments of the present disclosure may include an emission cycle control area close to the border between the first area A1 with a first emission angle and the second area A2 with a second emission angle.

For example, the 1-1 area A1-1 close to the border in the first area A1 and the 2-1 area A2-1 close to the border in the second area A2 may be set as the emission cycle control area.

The emission cycle control area is an area where the first light-emitting element ED1 and the second light-emitting element ED2 alternately emit light according to a predetermined cycle.

For example, the first light-emitting element ED1 and the second light-emitting element ED2 may alternately emit light in the 1-1 area A1-1. As the distance from the border increases, the emission cycle of the first light-emitting element ED1 may increase.

Also, the first light-emitting element ED1 and the second light-emitting element ED2 may alternately emit light in the 2-1 area A2-1. As the distance from the border increases, the emission cycle of the second light-emitting element ED2 may increase.

In this way, as the distance from the border increases, the degradation deviation may be reduced while naturally maintaining the luminance variation by increasing the emission ratio of the light-emitting element corresponding to the area.

The foregoing embodiments are briefly described below.

An embodiment of present disclosure may provide a display system, comprising a display panel including a plurality of unit subpixels comprising a first subpixel with a first emission angle and a second subpixel with a second emission angle, a gate driving circuit configured to supply gate signals to the display panel, and a timing controller configured to control an emission cycle of the first subpixel or the second subpixel for an emission cycle control area between an first area where the first subpixel emits light and an second area where the second subpixel emits light.

The display panel includes a dashboard display panel located in a driver's seat, a center fascia display panel located between the driver's seat and a passenger's seat, and a passenger display panel located on the passenger's seat.

The second emission angle is narrower than the first emission angle, and is a viewing angle that is recognized only by an occupant of a seat where the display panel is located.

The first subpixel includes a first light-emitting element, a first black matrix including an opening above the first light-emitting element, a first insulating layer formed on the first black matrix, a first gap filler formed on the first insulating layer, and a first lens with a first emission angle formed on the first gap filler.

The first lens is a semi-cylindrical lens with a rectangular bottom.

The second subpixel includes a second light-emitting element, a second black matrix including an opening above the second light-emitting element, a second insulating layer formed on the second black matrix, a second gap filler formed on the second insulating layer, and a second lens with a second emission angle formed on the second gap filler.

The second lens is a semi-spherical lens with a circular bottom. As such, the second lens is structurally different from the first lens.

The unit subpixel includes a number of the second subpixel greater than a number of the first subpixel.

The first area is located on an outside of the second area.

The second area has a variable size.

The first area includes a 1-1 area in which the first subpixel and the second subpixel alternately emit light, and a 1-2 area in which only the first subpixel emits light.

The emission cycle of the first subpixel increases as the first subpixel far away from the border between the first area and the second area.

The second area includes a 2-1 area in which the first subpixel and the second subpixel alternately emit light, and a 2-2 area in which only the second subpixel emits light.

The emission cycle of the second subpixel increases as the second subpixel far away from the border between the first area and the second area.

The gate driving circuit outputs a scan signal that controls driving timing of the unit subpixel, an emission signal that controls emission timing of the unit subpixel, a first cycle control signal that controls an emission cycle of the first subpixel, and a second cycle control signal that controls an emission cycle of the second subpixel.

The unit subpixel includes a first light-emitting element, a second light-emitting element, a first transistor transmitting a data voltage depending on a second scan signal, a second transistor transmitting a driving voltage depending on the emission signal, a driving transistor connecting a first node shared by the first transistor and the second transistor to a third node, and receiving a voltage charged in a storage capacitor as a gate voltage through a second node, a third transistor connecting the second node to the third node and being controlled by the second scan signal, a fourth transistor connected to the third node and controlled by the emission signal, a fifth transistor connected between the second node and a line supplying a second initialization voltage, and controlled by a first scan signal, a sixth transistor connected between a fourth node of the fourth transistor and an anode electrode of the first light-emitting element, and controlled by the first cycle control signal, a seventh transistor connected between the anode electrode of the first light-emitting element and a line supplying a first initialization voltage, and controlled by the second scan signal, and an eighth transistor connected between the fourth node of the fourth transistor and an anode electrode of the second light-emitting element, and controlled by the second cycle control signal.

An embodiment of present disclosure may provide a display driving method of driving a display panel including a plurality of unit subpixels comprising a first subpixel with a first emission angle and a second subpixel with a second emission angle, comprising a step of driving the first subpixel for a first area of the display panel, a step of driving the second subpixel for a second area of the display panel, a step of emitting alternately the first subpixel and the second subpixel at a predetermined cycle for a 1-1 area within the first area, and a step of emitting alternately the first subpixel and the second subpixel at a predetermined cycle for a 2-1 area within the second area.

The emission cycle of the first subpixel in the 1-1 area increases as the first subpixel far away from the border between the first area and the second area.

The emission cycle of the second subpixel in the 2-1 area increases as the second subpixel far away from the border between the first area and the second area.

An embodiment of present disclosure may provide a vehicle, comprising a display panel including a plurality of unit subpixels comprising a first subpixel with a first emission angle and a second subpixel with a second emission angle, a gate driving circuit configured to supply gate signals to the display panel, and a timing controller configured to control an emission cycle of the first subpixel or the second subpixel for an emission cycle control area between an first area where the first subpixel emits light and an second area where the second subpixel emits light.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display system, comprising:
 a display panel including a plurality of unit subpixels, a unit subpixel including a first subpixel having a first emission angle and a second subpixel having a second emission angle;
 a gate driving circuit configured to supply gate signals to the display panel; and
 a timing controller configured to control an emission cycle of one or more of the first subpixel or the second subpixel for an emission cycle control area between an first area where the first subpixel is configured to emit light and an second area where the second subpixel is configured to emit light.

2. The display system of claim 1, wherein the display panel includes:
 a dashboard display panel located where a driver's seat faces;
 a center fascia display panel located between the driver's seat and a passenger's seat; and
 a passenger display panel located where the passenger's seat faces.

3. The display system of claim 1, wherein the second emission angle is narrower than the first emission angle, and is a viewing angle configured to be recognized only by an occupant of a seat where the display panel faces.

4. The display system of claim 1, wherein the first subpixel includes:
 a first light-emitting element;
 a first black matrix including an opening above the first light-emitting element;
 a first insulating layer formed on the first black matrix;
 a first gap filler formed on the first insulating layer; and
 a first lens with the first emission angle formed on the first gap filler.

5. The display system of claim 4, wherein the first lens is a semi-cylindrical lens with a rectangular bottom.

6. The display system of claim 1, wherein the second subpixel includes:
 a second light-emitting element;
 a second black matrix including an opening above the second light-emitting element;
 a second insulating layer formed on the second black matrix;
 a second gap filler formed on the second insulating layer; and
 a second lens with the second emission angle formed on the second gap filler.

7. The display system of claim 6, wherein the second lens is a semi-spherical lens with a circular bottom.

8. The display system of claim 1, wherein the unit subpixel includes a second number of the second subpixels and a first number of the first subpixels, the second number greater than the first number.

9. The display system of claim 1, wherein the first area is located on an outside of the second area.

10. The display system of claim 1, wherein the second area has a variable size.

11. The display system of claim 1, wherein the first area includes:
 an 1-1 area in which the first subpixel and the second subpixel are configured to alternately emit light; and
 an 1-2 area in which only the first subpixel is configured to emit light.

12. The display system of claim 11, wherein the emission cycle of the first subpixel increases as a distance between the first subpixel and a border between the first area and the second area increases.

13. The display system of claim 1, wherein the second area includes:
 an 2-1 area in which the first subpixel and the second subpixel are configured to alternately emit light; and
 an 2-2 area in which only the second subpixel is configured to emit light.

14. The display system of claim 13, wherein the emission cycle of the second subpixel increases as a distance between the second subpixel and a border between the first area and the second area increases.

15. The display system of claim 1, wherein the gate driving circuit is configured to output:
 a scan signal that controls driving timing of the unit subpixel;
 an emission signal that controls emission timing of the unit subpixel;
 a first cycle control signal that controls an emission cycle of the first subpixel; and
 a second cycle control signal that controls an emission cycle of the second subpixel.

16. The display system of claim 15, wherein the unit subpixel includes:
 a first light-emitting element;
 a second light-emitting element;
 a first transistor configured to transmit a data voltage based on a second scan signal;
 a second transistor configured to transmit a driving voltage based on the emission signal;
 a driving transistor connected between a first node shared by the first transistor and the second transistor and a third node, and connected to receive a voltage charged in a storage capacitor as a gate voltage through a second node;
 a third transistor connected between the second node and the third node and connected to be controlled by the second scan signal;
 a fourth transistor connected to the third node and connected to be controlled by the emission signal;
 a fifth transistor connected between the second node and a line supplying a second initialization voltage, and connected to be controlled by a first scan signal;
 a sixth transistor connected between a fourth node of the fourth transistor and an anode electrode of the first light-emitting element, and connected to be controlled by the first cycle control signal;
 a seventh transistor connected between the anode electrode of the first light-emitting element and a line supplying a first initialization voltage, and connected to be controlled by the second scan signal; and
 an eighth transistor connected between the fourth node of the fourth transistor and an anode electrode of the second light-emitting element, and connected to be controlled by the second cycle control signal.

17. A display driving method of driving a display panel including a plurality of unit subpixels each including a first subpixel having a first emission angle and a second subpixel having a second emission angle, comprising:
- driving the first subpixel for a first area of the display panel;
- driving the second subpixel for a second area of the display panel;
- controlling to emit light alternately by the first subpixel or the second subpixel at a cycle for an 1-1 area within the first area; and
- controlling to emit light alternately by the first subpixel or the second subpixel at a cycle for an 2-1 area within the second area.

18. The display driving method of claim 17, wherein an emission cycle of the first subpixel in the 1-1 area increases as a distance from the first subpixel to a border between the first area and the second area increases.

19. The display driving method of claim 17, wherein an emission cycle of the second subpixel in the 2-1 area increases as a distance from the second subpixel to a border between the first area and the second area increases.

20. A vehicle, comprising:
- a display panel including a plurality of unit subpixels, each unit subpixel including a first subpixel having a first emission angle and a second subpixel having a second emission angle;
- a gate driving circuit configured to supply gate signals to the display panel; and
- a timing controller configured to control an emission cycle of one or more of the first subpixel or the second subpixel for an emission cycle control area between a first area where the first subpixel is configured to emit light and an second area where the second subpixel is configured to emit light.

21. A display system, comprising:
- a display panel including a plurality of unit subpixels, a unit subpixel of the plurality of unit subpixels including a first subpixel configured to emit light in a first area and a second subpixel configured to emit light in a second area;
- a gate driving circuit configured to supply gate signals to the display panel; and
- a timing controller configured to control an emission cycle of one or more of the first subpixel or the second subpixel based on a distance from a respective one of the one or more of the first subpixel or the second subpixel to a border between the first area and the second area.

22. The display system of claim 21, wherein the first subpixel includes a first emission angle and the second subpixel includes a second emission angle different from the first emission angle.

23. The display system of claim 21, wherein the first subpixel includes a first lens and the second subpixel includes a second lens structurally different from the first lens.

24. The display system of claim 23, wherein the first lens is a semi-cylindrical lens with a rectangular bottom and the second lens is a semi-spherical lens with a circular bottom.

25. The display system of claim 21, wherein the first subpixel and the second subpixel are configured to emit light of a same color.

* * * * *